US007603744B2

(12) United States Patent
Reindle

(10) Patent No.: US 7,603,744 B2
(45) Date of Patent: Oct. 20, 2009

(54) ROBOTIC APPLIANCE WITH ON-BOARD JOYSTICK SENSOR AND ASSOCIATED METHODS OF OPERATION

(75) Inventor: Mark E. Reindle, Sagamore Hills, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 669 days.

(21) Appl. No.: 10/946,219

(22) Filed: Sep. 21, 2004

(65) Prior Publication Data

US 2005/0217061 A1    Oct. 6, 2005

Related U.S. Application Data

(60) Provisional application No. 60/559,186, filed on Apr. 2, 2004.

(51) Int. Cl.
*A47L 5/00* (2006.01)
(52) U.S. Cl. .............................. 15/319; 15/339; 700/245
(58) Field of Classification Search ................... 15/319, 15/340.4, 445, 320, 1, 340.1, 339; 700/245
See application file for complete search history.

(56) References Cited

U.S. PATENT DOCUMENTS

| 5,321,614 | A | 6/1994 | Ashworth | |
|---|---|---|---|---|
| 5,781,960 | A | 7/1998 | Kilstrom et al. | |
| 5,867,800 | A | 2/1999 | Leif | |
| 6,226,830 | B1 * | 5/2001 | Hendriks et al. | 15/319 |
| 6,327,741 | B1 * | 12/2001 | Reed | 15/319 |
| 6,370,453 | B2 | 4/2002 | Sommer | |
| 6,457,206 | B1 * | 10/2002 | Judson | 15/320 |
| 6,481,515 | B1 | 11/2002 | Kirkpatrick et al. | |

(Continued)

FOREIGN PATENT DOCUMENTS

EP    1 265 119    3/2005

(Continued)

OTHER PUBLICATIONS

Essam Badreddin et al., "Reflexive Collision Avoidance in a Recursive Architecture", *Robotics and Autonomous Systems*, vol. 8, No. 3, Jan. 1991, pp. 177-186, XP000257735, ISSN: 0921-8890, Elsevier Science Publishers, Amsterdam, NL.

(Continued)

*Primary Examiner*—Lee D Wilson
(74) *Attorney, Agent, or Firm*—Fay Sharpe LLP

(57) ABSTRACT

A robotic appliance with a joystick sensor and associated methods of operation are provided. In one embodiment, the robotic appliance includes: a housing, a joystick sensor configured to provide sensed signals that vary as the robotic appliance traverses a surface area and comes in contact with an obstacle, a controller adapted to receive the sensed signals, wherein the controller determines the direction of the obstacle in relation to the robotic appliance and an x-y plane corresponding to the surface area based on the sensed signals and controls the robotic appliance based on the direction of the obstacle, a propelling mechanism, and a bumper that defines a periphery for a front section and a rear section of the robotic appliance in the x-y plane, wherein the bumper is in operative communication with the joystick sensor so that movement of the bumper in relation to the housing varies the sensed signals.

37 Claims, 24 Drawing Sheets

U.S. PATENT DOCUMENTS

| | | | |
|---|---|---|---|
| 6,580,246 B2 * | 6/2003 | Jacobs | 318/568.16 |
| 6,748,297 B2 * | 6/2004 | Song et al. | 700/259 |
| 6,883,201 B2 * | 4/2005 | Jones et al. | 15/319 |
| 6,968,592 B2 * | 11/2005 | Takeuchi et al. | 15/319 |
| 2002/0116089 A1 | 8/2002 | Kirkpatrick, Jr. | |
| 2004/0143930 A1 | 7/2004 | Haegermarck | |
| 2005/0217061 A1 * | 10/2005 | Reindle | 15/319 |

FOREIGN PATENT DOCUMENTS

| | | |
|---|---|---|
| JP | 11-178764 | 7/1999 |
| WO | WO 00/04430 | 1/2000 |
| WO | WO 01/31414 A | 5/2001 |
| WO | WO 01/91623 A2 | 12/2001 |
| WO | WO 02/039868 | 5/2002 |
| WO | WO 02/067745 | 9/2002 |

OTHER PUBLICATIONS

European Search Report mailed Oct. 5, 2007 for European Patent Application No. EP 05 00 7299.

* cited by examiner

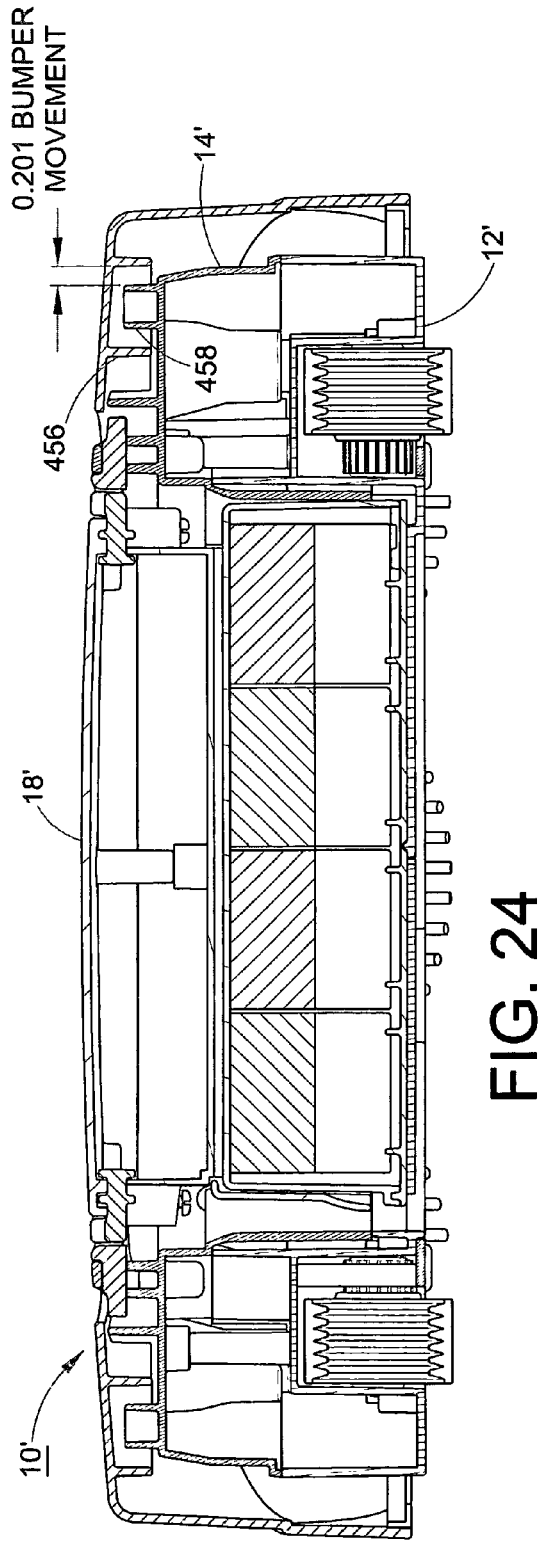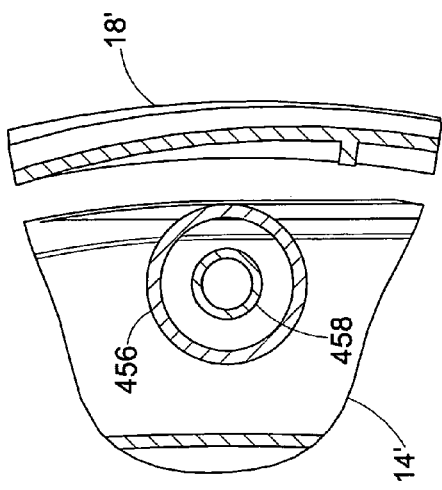
FIG. 24
FIG. 25

US 7,603,744 B2

ROBOTIC APPLIANCE WITH ON-BOARD JOYSTICK SENSOR AND ASSOCIATED METHODS OF OPERATION

This application claims the benefit of U.S. Provisional Patent Application Ser. No. 60/559,186, filed on Apr. 2, 2004, the disclosure of which is incorporated herein by reference.

BACKGROUND OF INVENTION

The invention relates to a robotic appliance with an on-board joystick sensor. It finds particular application in conjunction with the detection of barriers and other obstacles using the on-board joystick sensor and the corresponding operation of the robotic appliance to perform a functional task while avoiding obstacles and will be described with particular reference thereto. However, it is to be appreciated that the invention is also amenable to other applications. For example, the joystick sensor may be used in conjunction with a wall-following operation of the robotic appliance.

Currently, some mobile robotic devices include complex suspension and linkage systems that operate one or more of multiple contact sensors when the outer shell of the device comes in contact with an obstacle. However, these devices are typically too complex, too expensive, and relatively inflexible for use in multiple types of robotic appliances. Several patent documents disclose such mobile robotic devices.

For example, one type of mobile robot includes a robot touch shield device that includes a shell supported by at least one shell support member mounted on a base member and a sensor device for sensing an exterior force applied to the shell. The sensor device has a base sensor portion with a center and a vertical member. The base sensor portion is affixed on the base member. The vertical member is affixed on the shell. The vertical member is positioned over the center of the base sensor portion. The exterior force applied to the shell translates the shell relative to the base member, the base sensor portion senses a displacement of the vertical member relative to the center of the base sensor portion, and produces an output representing at least one of a direction of the exterior force applied and the degree of the exterior force applied.

Another mobile robot is an autonomous mobile surface treating apparatus having a chassis, a drive mechanism mounted to the chassis by a suspension, and a substantially rigid shell movably mounted to the chassis. The suspension includes a resilient member interposed between the drive mechanism and the chassis so that when the shell is pushed toward the supporting surface with a predetermined force, the resilient member compresses to permit the drive mechanism to move and the shell and/or the chassis to contact the supporting surface. The shell is supported by a plurality of elongated elastic supports received within a plurality of elongated openings in the chassis. A passive portion of a collision detection sensor is attached to a central portion of the shell. A non-skid lower edge member is movably attached to the shell to adjust a clearance between the non-skid lower edge member and the supporting surface.

Thus there is a particular need for a means for avoiding obstacles and/or following walls or other barriers that is less complex, less expensive, and more robust than previous designs for robotic appliances.

BRIEF SUMMARY OF INVENTION

The invention contemplates use of a joystick sensor in a robotic appliance to detect barriers and other obstacles and associated methods of operation that overcome at least one of the above mentioned problems and others.

In one aspect, a robotic appliance is provided. In one embodiment, the robotic appliance includes: a housing, a joystick sensor mounted to the housing and configured to provide one or more sensed signals that vary as the robotic appliance traverses a surface area and comes in contact with an obstacle, a controller mounted to the housing and adapted to receive the one or more sensed signals, wherein the controller determines the direction of the obstacle in relation to the robotic appliance and an x-y plane corresponding to the surface area based at least in part on the one or more sensed signals and controls the robotic appliance based at least in part on the direction of the obstacle, traction means mounted to the housing and in communication with the controller, wherein the traction means propels the robotic appliance over the surface area, and a bumper that defines a periphery for at least a front section and a rear section of the robotic appliance in the x-y plane, wherein the bumper is in operative communication with the joystick sensor so that movement of the bumper in relation to the housing varies the one or more sensed signals provided by the joystick sensor.

In another embodiment, the robotic appliance includes: a housing, a joystick sensor mounted to the housing and configured to provide one or more sensed signals that vary as the robotic appliance traverses a surface area and comes in contact with an obstacle, a controller mounted to the housing and adapted to receive the one or more sensed signals, wherein the controller determines the direction of the obstacle in relation to the robotic appliance and an x-y plane corresponding to the surface area based at least in part on the one or more sensed signals and controls movement of the robotic appliance to move away from the obstacle in response to the contact with the obstacle and to continue traversing the surface area so as to avoid the obstacle based at least in part on the direction of the obstacle, traction means mounted to the housing and in communication with the controller, wherein the traction means propels the robotic appliance over the surface area, and a bumper that defines a periphery of the robotic appliance in the x-y plane, wherein the bumper is in operative communication with the joystick sensor so that movement of the bumper in relation to the housing varies the one or more sensed signals provided by the joystick sensor.

In another aspect, a method of controlling a robotic appliance for performance of a desired task while traversing a surface area is provided. In one embodiment, the method includes: a) providing a robotic appliance including a housing, a joystick sensor mounted to the housing and configured to provide one or more sensed signals that vary as the robotic appliance traverses a surface area and comes in contact with an obstacle, a controller mounted to the housing and adapted to receive the one or more sensed signals, traction means mounted to the housing and in communication with the controller, functional means mounted to the housing and in communication with the controller, and a bumper that defines a periphery of the robotic appliance in an x-y plane corresponding to the surface area, wherein the bumper is in operative communication with the joystick sensor so that movement of the bumper in relation to the housing varies the one or more sensed signals provided by the joystick sensor, b) powering up the robotic appliance, c) selecting an operating mode for the robotic appliance, d) starting operation of the robotic appliance, e) controlling the traction means to propel the robotic appliance over the surface area based at least in part on the operating mode selected, f) controlling the functional means to perform the desired task based at least in part on the operating mode selected, g) determining when the robotic appliance comes in contact with the obstacle and at least a direction of the obstacle in relation to the robotic appliance and the x-y plane based at least in part on the one or more sensed signals, and h) controlling movement of the robotic appliance to move away from the obstacle in response to the contact with the obstacle in response to the contact with the obstacle and to continue traversing the surface area so as to avoid the obstacle based at least in part on the direction of the obstacle.

In another embodiment, the method includes: a) providing a robotic appliance including a housing, a joystick sensor mounted to the housing and configured to provide one or more sensed signals that vary as the robotic appliance traverses a surface area and comes in contact with an obstacle, a controller mounted to the housing and adapted to receive the one or more sensed signals, traction means mounted to the housing and in communication with the controller, functional means mounted to the housing and in communication with the controller, and a bumper that defines a periphery for at least a front section and a rear section of the robotic appliance in an x-y plane corresponding to the surface area, wherein the bumper is in operative communication with the joystick sensor so that movement of the bumper in relation to the housing varies the one or more sensed signals provided by the joystick sensor, b) powering up the robotic appliance, c) selecting an operating mode for the robotic appliance, d) starting operation of the robotic appliance, e) controlling the traction means to propel the robotic appliance over the surface area based at least in part on the operating mode selected, f) controlling the functional means to perform the desired task based at least in part on the operating mode selected, g) determining when the robotic appliance comes in contact with the obstacle and at least a direction of the obstacle in relation to the robotic appliance and the x-y plane, and h) controlling the robotic appliance in response to the contact with the obstacle.

In still another aspect, a robotic appliance for performance of a desired task while traversing a surface area is provided. In one embodiment, the robotic appliance includes: a housing, a joystick sensor mounted to the housing and configured to provide one or more sensed signals that vary as the robotic appliance traverses a surface area and comes in contact with an obstacle, traction means mounted to the housing, functional means mounted to the housing, first control means for powering up the robotic appliance, second control means for selecting an operating mode for the robotic appliance, third control means for starting operation of the robotic appliance, processing means mounted to the housing and adapted to receive the one or more sensed signals in communication with the first, second, and third control means, traction means, and functional means for: i) controlling the traction means to propel the robotic appliance over the surface area based at least in part on the operating mode selected, ii) controlling the functional means to perform the desired task based at least in part on the operating mode selected, iii) determining when the robotic appliance comes in contact with the obstacle and at least a direction of the obstacle in relation to the robotic appliance and an x-y plane corresponding to the surface area, and iv) controlling the robotic appliance in response to the contact with the obstacle, and a bumper that defines a periphery for at least a front section and a rear section of the robotic appliance in the x-y plane, wherein the bumper is in operative communication with the joystick sensor so that movement of the bumper in relation to the housing varies the one or more sensed signals provided by the joystick sensor.

In another embodiment, the robotic appliance includes: a housing, a joystick sensor mounted to the housing and configured to provide one or more sensed signals that vary as the robotic appliance traverses a surface area and comes in contact with an obstacle, traction means mounted to the housing, functional means mounted to the housing, a bumper that defines a periphery of the robotic appliance in an x-y plane corresponding to the surface area, wherein the bumper is in operative communication with the joystick sensor so that movement of the bumper in relation to the housing varies the one or more sensed signals provided by the joystick sensor, first control means for powering up the robotic appliance, second control means for selecting an operating mode for the robotic appliance, third control means for starting operation of the robotic appliance, and processing means mounted to the housing and adapted to receive the one or more sensed signals in communication with the traction means, functional means, and first, second, and third control means for: i) controlling the traction means to propel the robotic appliance over the surface area based at least in part on the operating mode selected, ii) controlling the functional means to perform the desired task based at least in part on the operating mode selected, iii) determining when the robotic appliance comes in contact with the obstacle and at least a direction of the obstacle in relation to the robotic appliance and the x-y plane based at least in part on the one or more sensed signals, and iv) controlling movement of the robotic appliance to move away from the obstacle in response to the contact with the obstacle in response to the contact with the obstacle and to continue traversing the surface area so as to avoid the obstacle based at least in part on the direction of the obstacle.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

FIG. 24 is a cross-section view of an embodiment of a robotic appliance according to the present invention showing upper bumper stops in the normal centered position.

FIG. 25 is a cutaway cross-section view of an embodiment of the bumper stop depicted FIG. 24.

DETAILED DESCRIPTION

Figure 1:
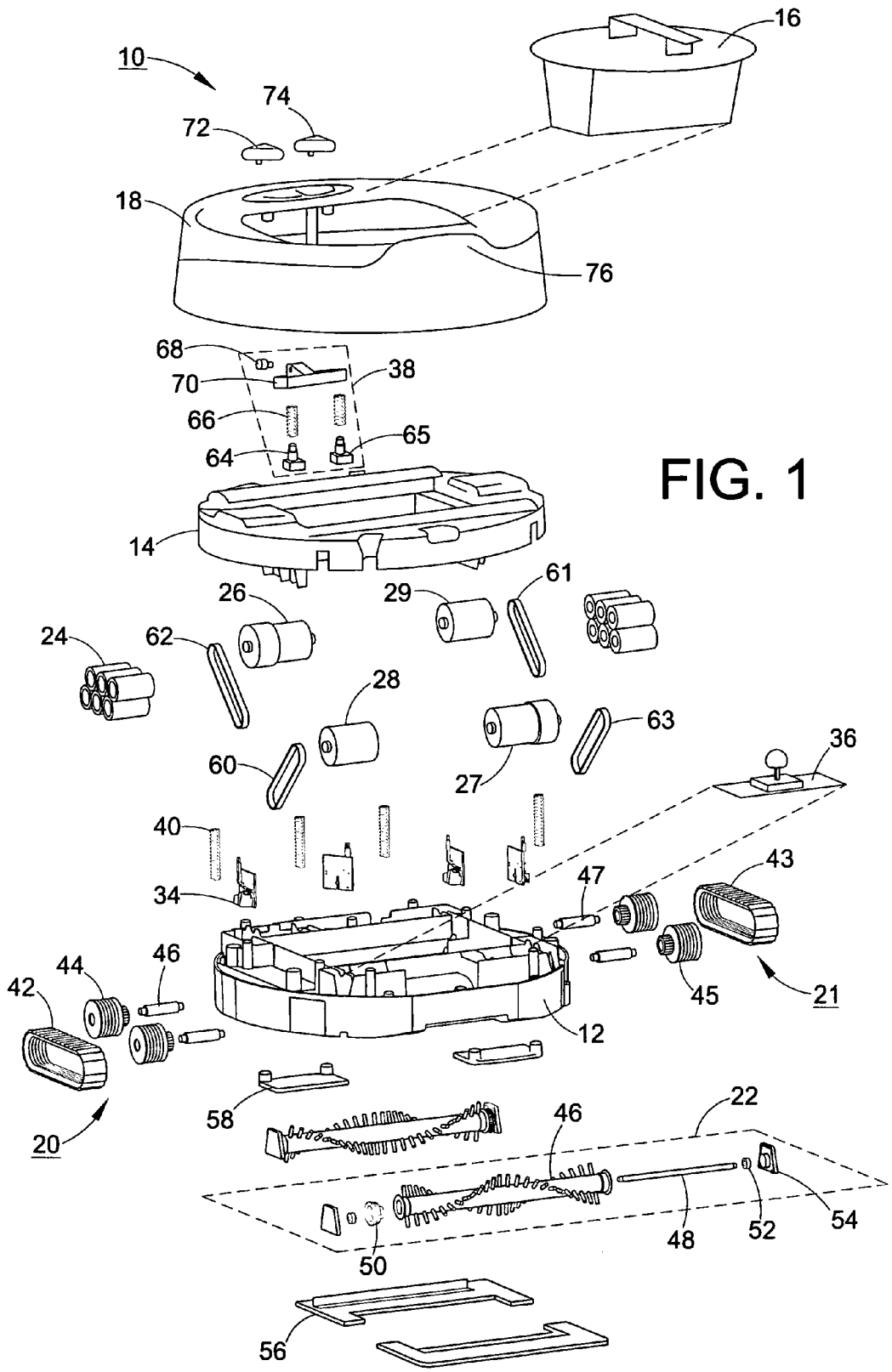
FIG. 1 is an exploded perspective view of an embodiment of a robotic appliance with an on-board joystick sensor and equipped to function as a sweeper, according to the present invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. Within the drawings, like reference numerals denote like elements.

With reference to FIG. 1, an embodiment of a robotic appliance 10 equipped to function as a robotic sweeper includes a base 12 and a base cover 14 secured to the base 12. A dirt cup assembly 16 is received by the base cover 14 and base 12. A bumper 18 floats above the base cover 14. First and second traction means, which can be first and second drive belt/tread assemblies 20, 21, and first and second cleaning means, which can be first and second brush roll assemblies 22, 23 are mounted to the base 12. Alternatively, for example, the traction means can be wheel assemblies that operate in conjunction with one or more additional swiveling/balancing wheel assemblies or rollers. Alternatively, for example, the cleaning means can be a stationary or vibrating brush or a mop head system with a replaceable mopping cloth. First and second battery packs 24, first and second drive motors 26, 27, and first and second brush roll motors 28, 29 can be mounted to the base 12. Also, first, second, third, and fourth floor sensor assemblies 34, and a main printed circuit board (PCB) assembly 36 can be mounted to the base 12. For example, the aforementioned elements can be installed between the base cover 14 and base 12. A switch assembly 38 can be installed between the base cover 14 and bumper 18 with switch activation mechanisms extending toward the bumper 18. First, second, third, and fourth bumper springs 40 can be received by bosses, sockets, studs, or projections in the base 12, extend through the base cover 14 toward the bumper 18, and can be received by corresponding bosses, sockets, studs, or projections in the bumper 18. In an alternate embodiment, the bumper 18 can be formed by multiple sections. For example, two half-sections or four quadrant-sections.

The first drive belt/tread assembly 20 can include a drive belt/tread 42, first and second drive pulleys 44, and first and second drive pins 46. The drive belt/tread 42 fits around the first and second drive pulleys 44. Each drive pin 46 is received by a corresponding drive pulley 44 and extends toward to the base 12. The first and second drive pins 46 in each drive belt/tread assembly 20 are received by the base 12 from the side and/or bottom. Likewise, the second drive belt/tread assembly 21 can include a drive belt/tread 43, first and second drive pulleys 45, and first and second drive pins 47.

If desired, each brush roll assembly 22, 23 can include a brush roll dowel assembly 46, a brush roll shaft 48 extending through the center of the brush roll dowel assembly 46, a brush roll sprocket 50 positioned at one end of the brush roll dowel assembly 46, first and second brush bearings 52 positioned at opposing ends of the brush K roll shaft 48, and first and second end caps 54 fitted to the brush bearings 52. The first and second brush roll assemblies 22, 23 can be received by the base 12 from the bottom. First and second nozzle guards 56 are fitted over the brush roll assemblies 22 to direct dirt and dust toward the dirt cup assembly 16. First and second bottom brackets 58 are attached to the bumper 18 to cooperate with cavities in the base 12 to guide and restrict horizontal movement of the base 12 in relation to the bumper 18 when the bumper 18 comes in contact with an obstacle.

A first brush roll belt 60 can extend from the first brush roll motor 28 to the brush sprocket 50 on the first brush roll assembly 22. Likewise, the second brush roll belt 61 can extend from the second brush roll motor 29 to a brush sprocket on the second brush roll assembly 23. The first and second brush roll motors 28, 29 can be operated to turn the brush roll assemblies 22 in opposite directions so that both brush roll assemblies 22 direct dirt and dust inwardly toward the dirt cup assembly 16. The brush roll motors 28, 29 may be variable speed, reversible, and independently controlled. For example, the brush roll motors 28, 29 may be reversed to remove clogged material from the dirt path.

A first drive belt 62 can extend from the first drive motor 26 to one of the drive pulleys 44 within the first drive belt/tread assembly 20. Likewise, the second drive belt 63 can extend from the second drive motor 27 to one of the drive pulleys 45 within the second drive belt/tread assembly 21. In this embodiment, the drive motors 26, 27 are variable speed, reversible, and independently controlled. For example, the first and second drive motors 26 may be simultaneously operated at different speeds and may also be simultaneously operated in different directions to both drive and steer the robotic appliance 10. In an alternate embodiment, one or more wheels may be linked to an actuator that is independently controlled and in conjunction with the drive means provides steering.

In the embodiment of FIG. 1, the switch assembly 38 includes first and second switches 64, 65, first and second switch springs 66, an AC power charging jack 68, and a switch holder 70. The first and second switch springs 66 fit over the activation mechanism associated with the first and second switches 64, 65, respectively. The first and second springs 66 and associated activation mechanisms are oriented toward the bumper 18. The switch holder 70 receives the first and second switches 64, 65 and the AC power charging jack 68. A left switch cover 72 is positioned on top of the bumper 18 so that when the left switch cover 72 is pressed the first switch 64 is activated. The associated switch spring 66 causes the left switch cover 72 to return to its normal position after it is released. Similarly, a right switch cover 74 is positioned on top of the bumper 18 so that when the right switch cover 74 is pressed the second switch 65 is activated. Likewise, the associated switch spring 66 causes the right switch cover 74 to return to its normal position after it is released. If desired, a tri-color indicator 76 (e.g., tri-color light emitting diode (LED)) can be positioned atop the base 12 to provide various indications related to activation of the switches 64, 65 and other aspects of operation of the robotic appliance 10.

In an alternate embodiment, the dirt cup assembly 16 may be replaced with a vacuum/dirt cup assembly 602 (FIG. 21) which converts the robotic appliance 10 from a robotic sweeper to a robotic vacuum cleaner. The brush roll assemblies 22, 23 are optional in the robotic vacuum cleaner configuration. In additional embodiments, the robotic appliance 10 (e.g., robotic sweeper or vacuum cleaner) may equipped with only the first brush roll assembly 22, rather than the two brush roll assemblies 22, 23 described above. As another embodiment, the robotic appliance 10 may be equipped with a floor mop module in place of the brush roll assemblies 22, 23 and dirt cup assembly 16. The floor mop module may include a mop head system with a replaceable mopping cloth. In further embodiments the floor mop module may also include a cleaning fluid distribution system.

Figure 2:
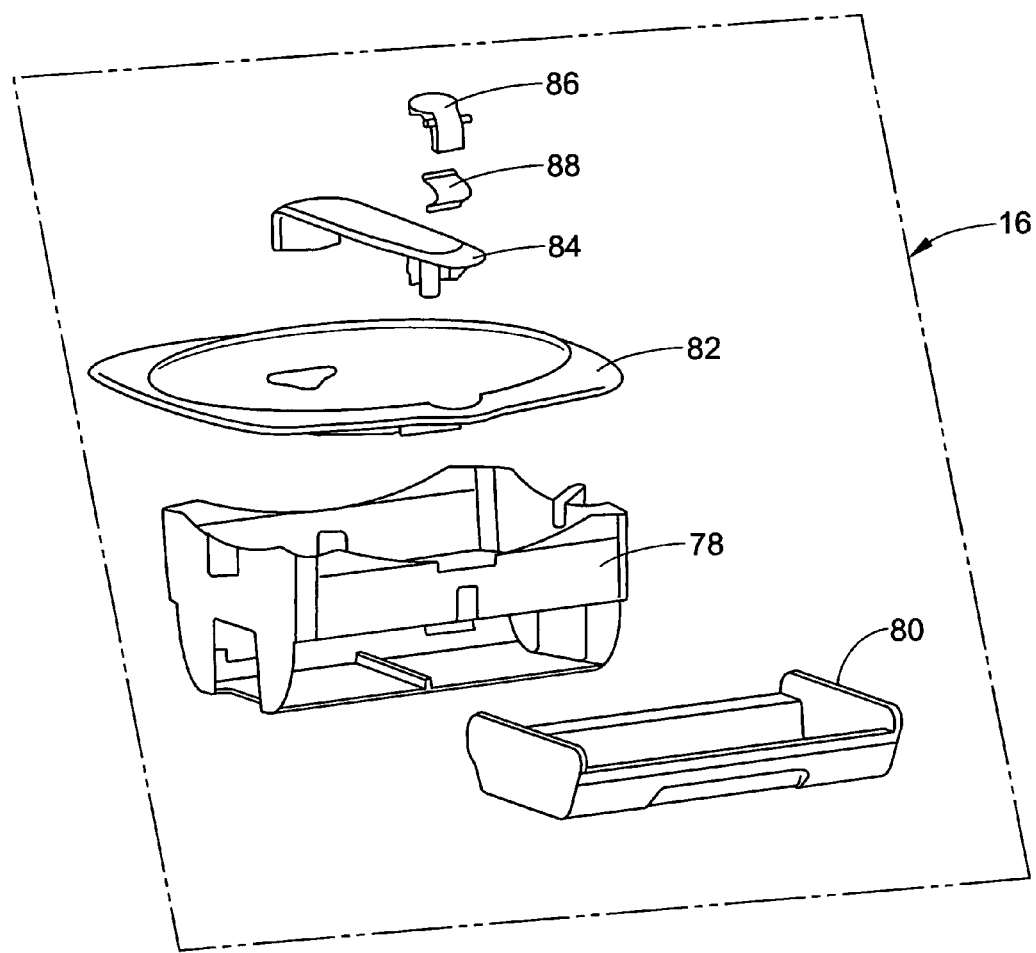
FIG. 2 is an exploded perspective view of an embodiment of a dirt cup assembly associated with the robotic appliance of FIG. 1.

With reference to FIG. 2, an embodiment of the dirt cup assembly 16 can include a dirt cup housing 78 that receives a dirt cup tray 80. The dirt cup tray 80 can slide into the housing 78 and latch in place. A lid 82 fits on top of the dirt housing 78. To release the dirt cup tray 80, a dirt cup handle 84 with a dirt cup latch 86 can be attached to the top of the lid 82. A dirt cup latch spring 88 returns the dirt cup latch 86 to its normal position after the latch is activated. In the embodiment being described, the dirt cup tray 80 collects dirt and dust when the dirt cup assembly 16 is installed and the robotic appliance 10 (FIG. 1) is operating. The dirt cup tray 80 can be emptied by removing the dirt cup assembly 16, activating the dirt cup latch 86 to release the dirt cup tray 80, removing the dirt cup tray 80 from the dirt cup assembly 16, and dumping the dirt cup tray 80 in a waste receptacle.

In another embodiment, the dirt cup assembly 16 does not include the dirt cup tray 80. Rather, the dirt cup housing 78 has a trap door that is linked to the dirt cup latch 86. In this embodiment, the dirt cup housing 78 collects dirt and dust when the dirt cup assembly 16 is installed and the robotic appliance 10 is operating. The dirt cup housing 78 can be emptied by removing the dirt cup assembly 16 and activating the dirt cup latch 86 to open the trap door.

Figure 3:
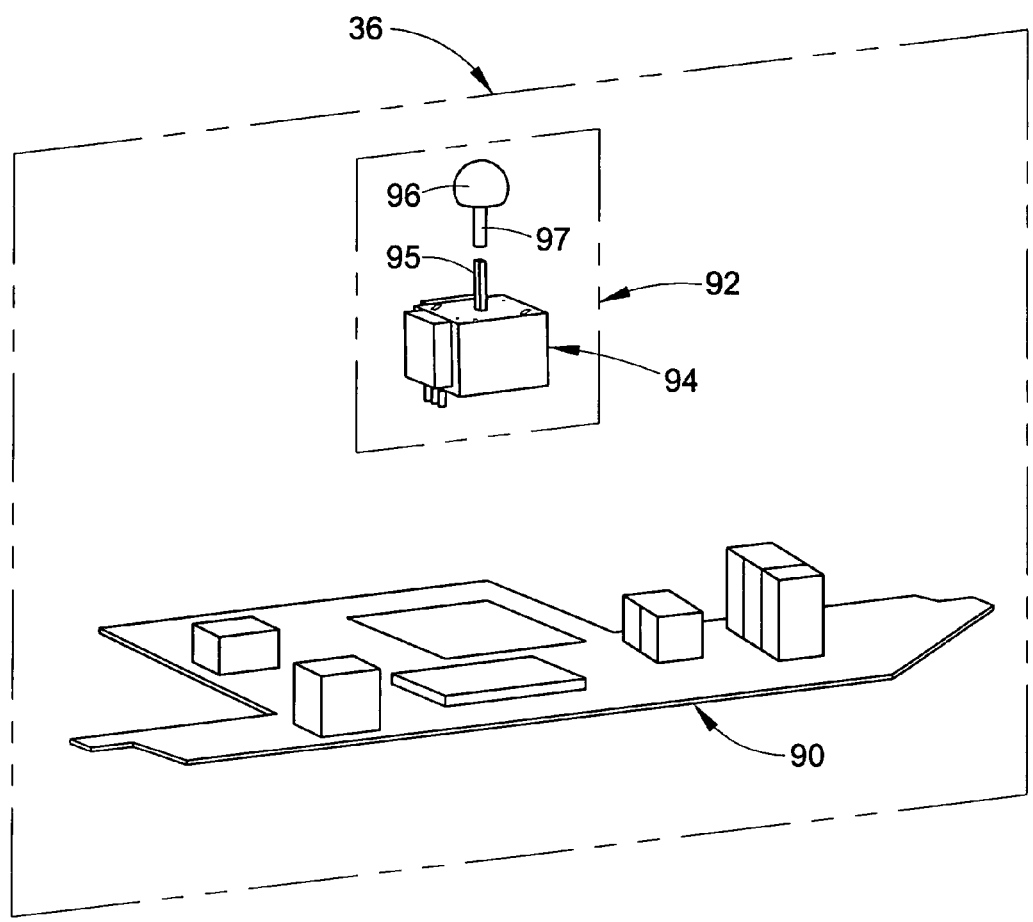
FIG. 3 is an exploded perspective view of a main printed circuit board (PCB) assembly associated with the robotic appliance of FIG. 1.

With reference to FIG. 3, an embodiment of the main PCB assembly 36 includes a main board 90 and a joystick sensor assembly 92 mounted to the main board 90. The joystick sensor assembly 92 includes a joystick sensor 94 with a shaft 95 and a head 96 with sleeve 97 that fits over the shaft 95. In the embodiment described, the joystick sensor 94 can be a two-axis potentiometer joystick with a spring-activated return-to-center feature associated with the shaft 95. The joystick sensor 94 can provide approximately ±25 degrees travel from the center position of the shaft 95. For example, joystick model number XVL161 manufactured by Noble USA, Inc. of Rolling Meadows, Ill. may be used as the joystick sensor. Of course, any other suitable conventional joystick can be used instead. In another embodiment, the head 96 may be adapted to fit directly on the shaft 95 of the joystick sensor 94 via a cylindrical cavity (e.g., see FIGS. 19 and 20).

Figure 21:
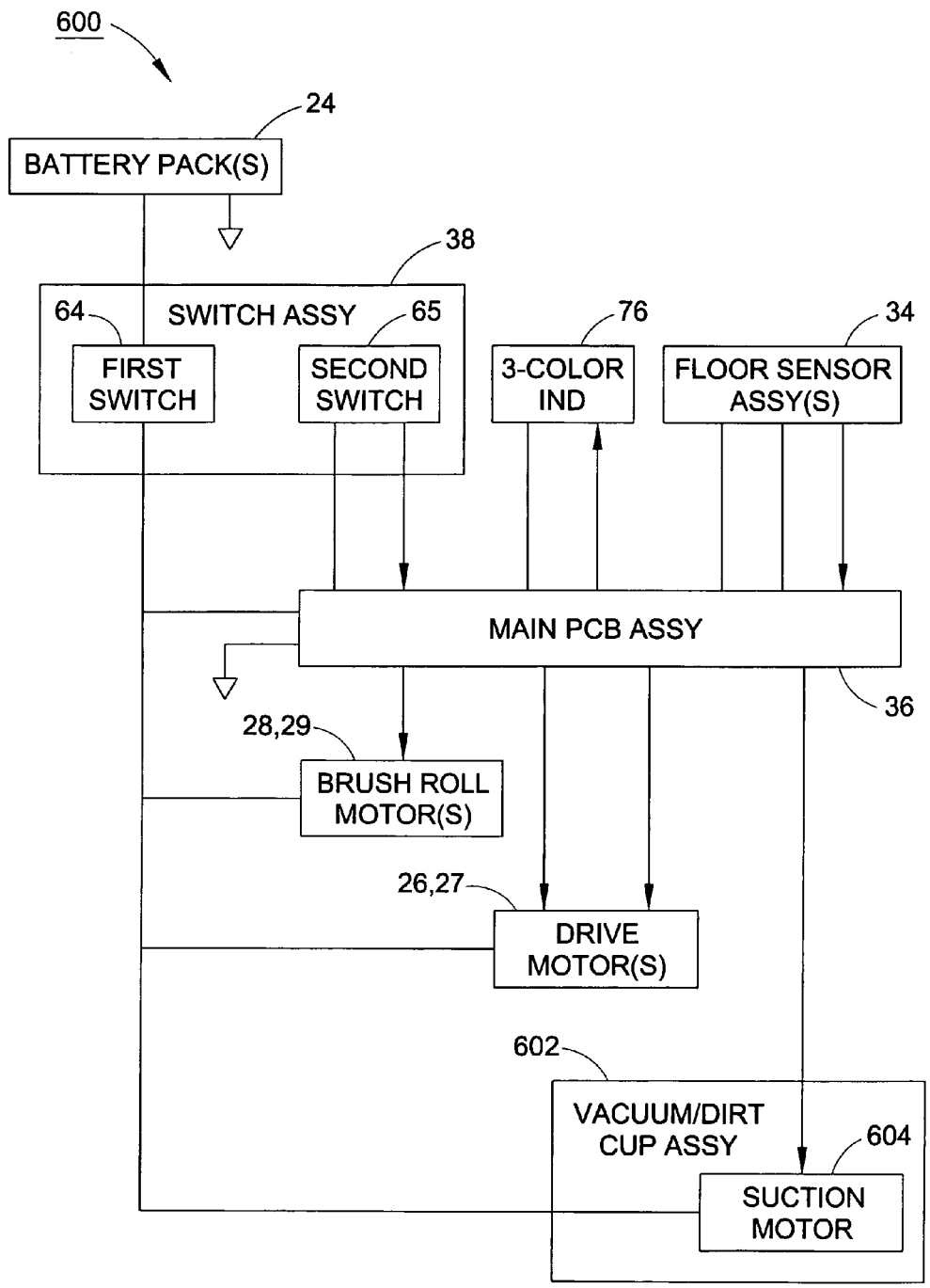
FIG. 21 is an electrical block diagram of an embodiment of a robotic appliance similar to the robotic appliance depicted in FIG. 1.

With reference to FIG. 21, an electrical block diagram 600 of the robotic appliance 10 (FIG. 1) shows that the first and second battery packs 24 may provide power to the first switch 64 of the switch assembly 38. The first switch 64, for example, is associated with the left switch cover 72 (FIG. 1) and used as a power switch. When the first switch 64 is closed, power may be distributed to the first and second drive motors 26, first and second brush roll motors 28, and main PCB assembly 36. The main PCB assembly 36 may also be in communication with the second switch 65 of the switch assembly 38 (e.g., the second switch 65 is associated with the right switch cover 74 (FIG. 1)), first and second brush roll motors 26, 27 first and second drive motors 28, 29 first, second, third, and fourth floor sensor assemblies 34, and tri-color indicator 76. The second switch 65, for example, functions as a combination start and mode selection switch. The main PCB assembly 36 may control the first and second drive motors 26, 27, first and second brush roll motors 28, 29, and tri-color indicator 76 based on the length and/or sequence of activations of the second switch 65, the condition of signals from the first, second, third, and fourth floor sensor assemblies 34, and/or the condition signals from the joystick sensor 92 (FIG. 3) within the main PCB assembly 36.

The electrical block diagram 600 also shows that the robotic appliance 10 (FIG. 1) may include an optional vacuum/dirt cup assembly 602 with a suction motor 604. When the vacuum/dirt cup assembly 602 is implemented in the robotic appliance 10 (FIG. 1) the brush roll assemblies 22, 23 (FIG. 1) and corresponding brush roll motors 28, 29 are optional. In this embodiment, the main PCB assembly 36 may also be in communication with the suction motor 604. Like the other motors, the main PCB assembly 36 may control the suction motor 604 based on the length and/or sequence of activations of the second switch 65, the condition of signals from the first, second, third, and fourth floor sensor assemblies 34, and/or the condition signals from the joystick sensor 92 (FIG. 3) within the main PCB assembly 36.

Figure 4:
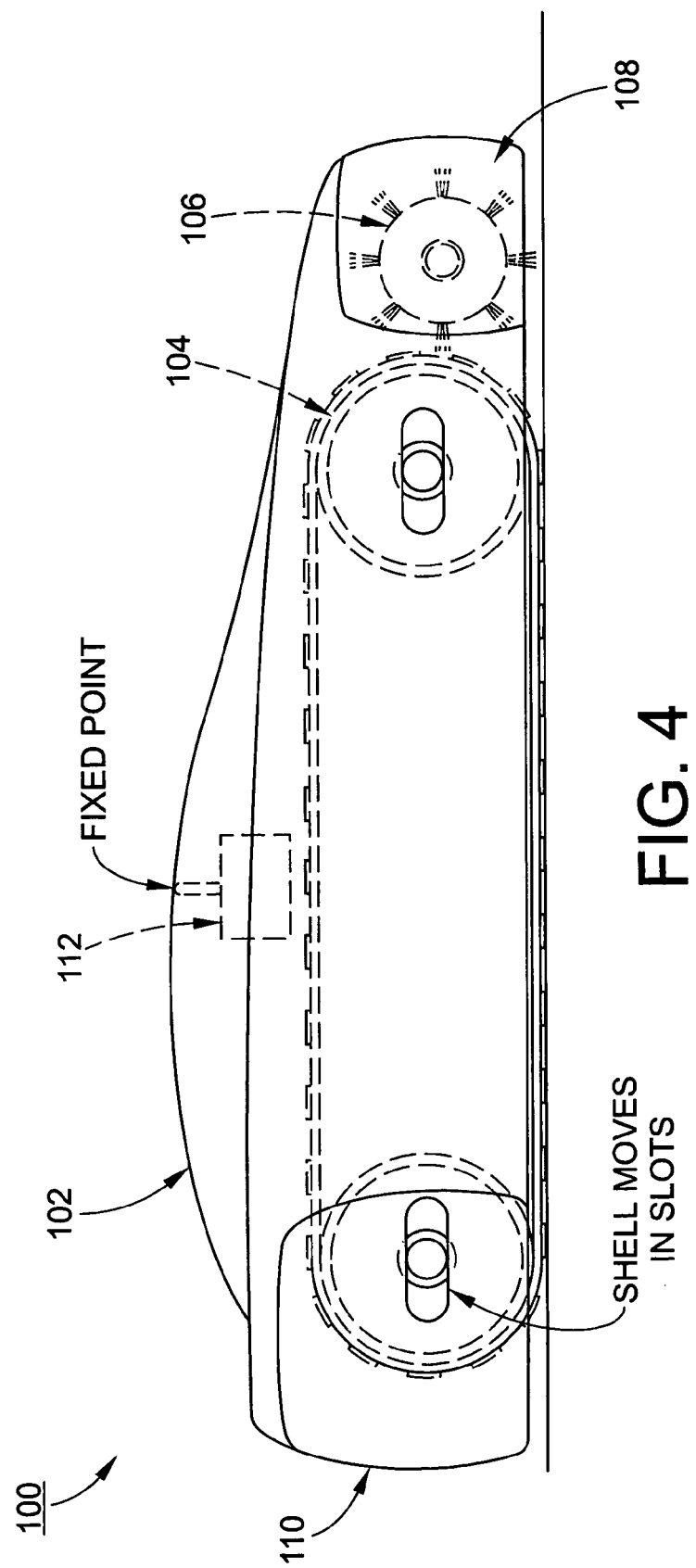
FIG. 4 is a side elevation view of another embodiment of a robotic appliance with an on-board joystick sensor and equipped with a brush roll for sweeping and/or vacuuming, according to the present invention.

With reference to FIG. 4, another embodiment of the robotic appliance 100 includes an upper housing 102, a drive means in the form of a track drive assembly 104, a brush roll assembly 106, a front bumper 108, a rear bumper 110, and a joystick sensor assembly 112. In this embodiment, the upper housing 102 floats above an inner housing and is linked by a suitable known linkage to the joystick sensor assembly 112 so that movement of the upper housing 102 causes deflection of a shaft extending upward from the joystick sensor assembly 112. The robotic appliance 100 being described can serve as a robotic sweeper. Of course, it may also be equipped with a suction motor 604 (FIG. 21) to serve as a robotic vacuum cleaner. The brush roll assembly 106 is optional in the robotic vacuum cleaner configuration.

Figure 5:
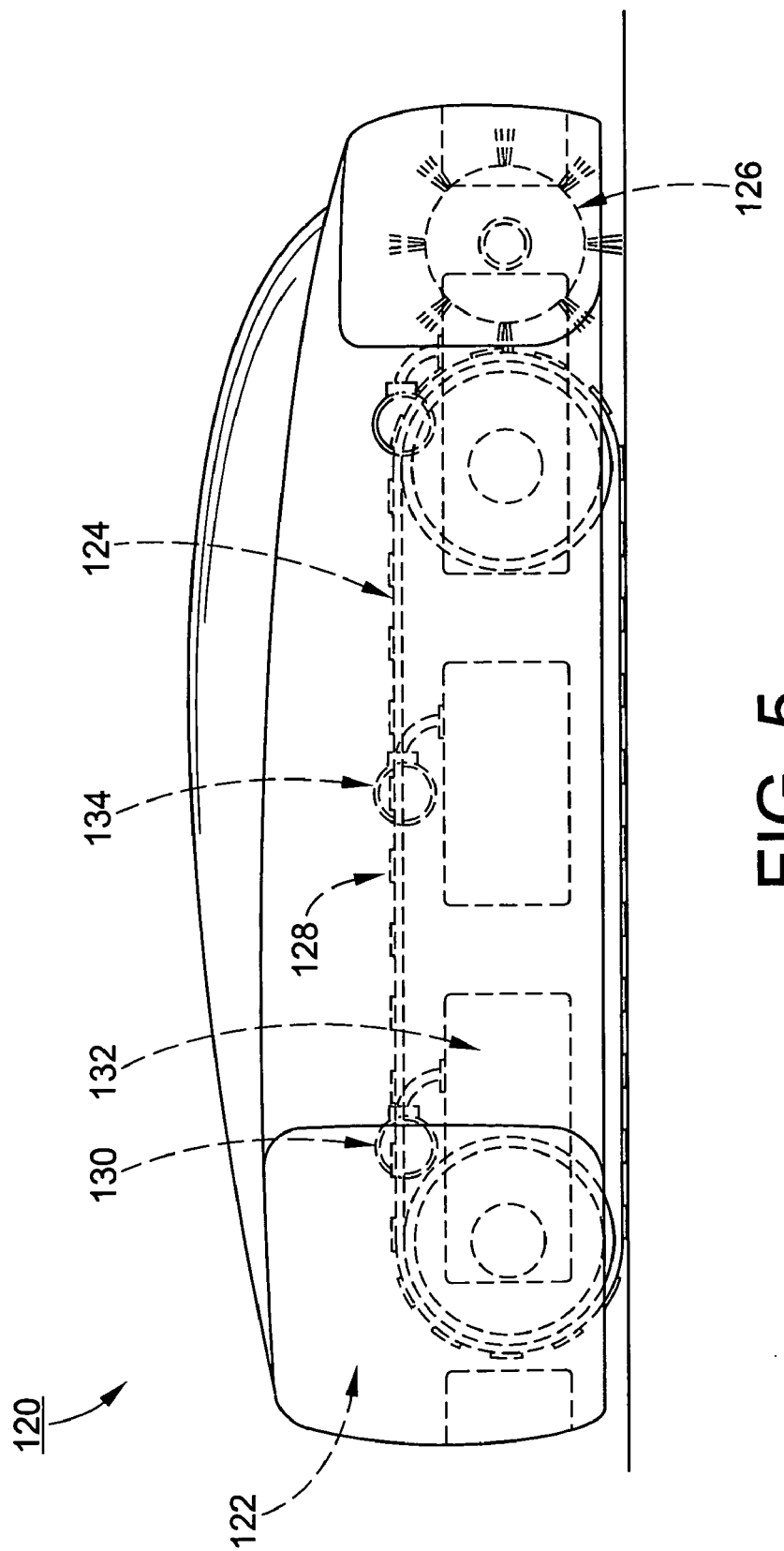
FIG. 5 is a side elevation view of yet another embodiment of a robotic appliance with an on-board pressure sensor and equipped with a brush roll for sweeping and/or vacuuming, according to the present invention.

With reference to FIG. 5, another embodiment of a robotic appliance 120 includes a fixed rigid outer shell 122, a track drive assembly 124, a brush roll assembly 126, and a plurality of pressure sensor assemblies 128. Each pressure sensor assembly 128 can include a pressure sensor 130, a sealed inflatable bumper 132, and an interconnecting air tube 134. The sealed inflatable bumpers 132 are positioned along the outer edge of the fixed outer shell 122. This embodiment of the robotic appliance 120 being described serves as a robotic sweeper. As with the previous embodiment, a suction motor 604 (FIG. 21) may be added to this embodiment to convert the robotic sweeper to a robotic vacuum cleaner. The brush roll assembly 126 is optional in the robotic vacuum cleaner configuration.

Figure 6:
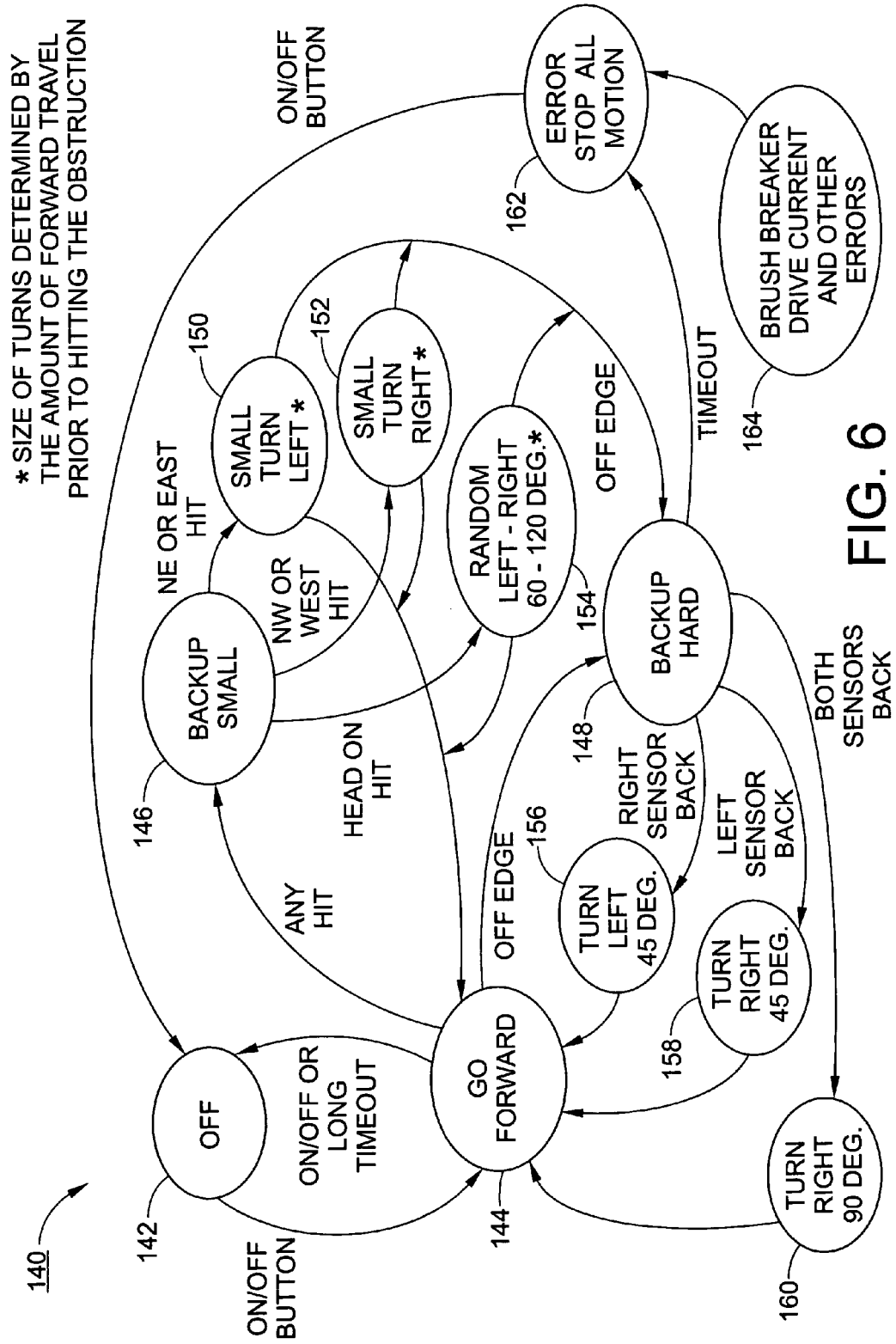
FIG. 6 is a state diagram illustrating the operations of a robotic appliance according to the present invention equipped with an on/off control, a joystick sensor for detecting barriers and other obstacles, and floor sensors for detecting loss of floor conditions.
Figure 7:
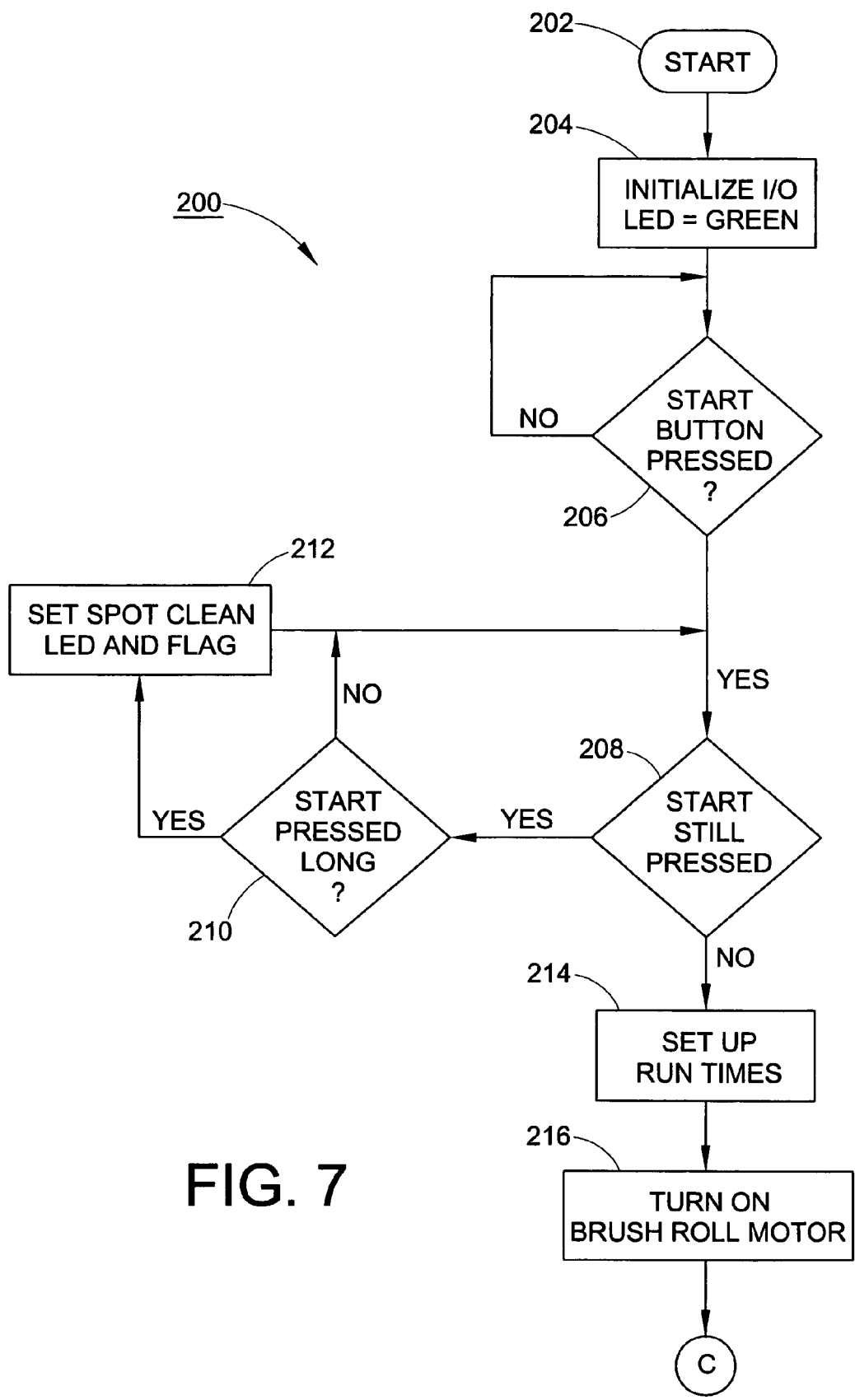
FIGS. 7-10 are sections of a flow chart showing main control of a robotic appliance according to the present invention equipped with a joystick sensor for sensing barriers and other obstacles and floor sensors for detecting loss of floor conditions.

In reference to FIGS. 1, 3, and 6, an exemplary state diagram 140 identifies various operational states of the robotic appliance and transitions from state to state. Generally, operation of the robotic appliance includes control of movement (e.g., first and second drive belt/tread assemblies 20, 21) and control of the cleaning implement (e.g., first and second brush roll assemblies 22, 23). More specifically, operation of the first and second drive motors 26, 27 and first and second brush roll motors 28, 29 is controlled by the main PCB assembly 36 in response to certain activations of the first and second switches 64, 65 and detection of certain conditions by the first, second, third, or fourth floor sensor assemblies 34 and joystick sensor assembly 92. The first switch 66, for example, may be a two-position latching pushbutton switch that functions as a main power switch. Thus, depressing the left switch cover 72 causes alternating activations of the first switch to turn main power on and off. When main power is on, the tri-color indicator 76, for example, may be illuminated red. Conversely, when main power is off, the tri-color indicator is extinguished.

The second switch 65 may be a momentary two-position pushbutton switch for selection between various operating modes of the robotic appliance. Thus, when the right switch cover 74 is pressed to activate the second switch, the main PCB assembly 36 detects each activation and may distinguish between a short activation and a long activation. For example, a single short activation of the second switch may cause the robotic appliance to start normal operation (e.g., one brush rotating) and cause the tri-color indicator to illuminate green. Two or more short activations within a predetermined time may cause the robotic appliance to start deep cleaning operation (e.g., both brushes rotating). A single long activation of the second switch may begin a first specialty type of operation, such as a narrow range spot clean operation in a preselected pattern. Two or more long activations within a predetermined time may cause the robotic appliance to begin operation in a second specialty mode, such as a wider range and/or a different pre-selected pattern for spot clean operation. The main PCB assembly 36 may be adapted to detect a combination of short and long activations to initiate normal cleaning or deep cleaning in either of the specialty modes. Additionally, a single short activation of the second switch during operation may be used to stop the current operating mode. Of course, any sequence of short and long activations that is suitable to an operator and distinguishable by the main PCB assembly 36 may be implemented. Similarly, various durations of activation that are distinguishable by the main board may be the basis for controlling different operations.

In the embodiment being described the bumper 18 floats over the base cover 14 on the bumper springs 40. In other words, the bumper 18 is spaced from the base cover 14 and base 12 by resilient biasing means (e.g., bumper springs 40) such that the bumper 18 can move in relation to the base cover 14 and base 12. The only rigid link between the bumper 18 and the base 12 is the joystick sensor assembly 92. A boss or socket in the bumper 18 receives the head 96 of the joystick sensor assembly 92. When the robotic appliance moves and the bumper 18 comes in contact with a barrier or another type of obstacle, the bumper 18 normally stops other components of the robotic appliance 10 continue to move in relation to the bumper 18. This causes the head 96 and shaft 95 extending from the joystick sensor 94 to move. The main PCB assembly 36 detects contact with the obstacle based on a signal from the joystick sensor 94 corresponding to the movement of the shaft 95. The base 12 or base cover 14 may includes stops that limit movement of the bumper 18 so that it cannot move beyond the range of movement of the shaft 95 associated with the joystick sensor 94. In the embodiment being described, the bottom brackets 58 attached to the bumper 18 cooperate with cavities in the base 12 to guide and restrict horizontal movement of the base 12 in relation to the bumper 18 so that such movement does not exceed the range of the shaft 95 when the bumper 18 comes in contact with an obstacle. In an alternate embodiment, the bumper 18 can be formed by multiple sections. For example, two half sections or four quadrant sections.

If desired, the floor sensors 34 can be infrared (IR) sensors with an emitter and corresponding detector. The emitter having a field of emission directed downward toward a surface or floor at a location ahead of a corresponding drive means, such as the belt/tread assembly 20. The detector has a field of view that intersects the field of emission of the corresponding emitter so that off edge and loss of floor conditions can be detected before the robotic appliance, for example, becomes hung up in a depression or tumbles down a staircase.

With continuing reference to FIG. 6, the state diagram 140 depicts operation of the robotic appliance. For example, operation begins after the robotic appliance is powered on and the start control is activated. Then, the robotic appliance begins moving forward. Obstacles, such as furniture, clutter, walls, and other barriers are detected by coming into contact therewith. When an obstacle is detected, the robotic appliance either backs up or turns to move away from the obstacle. The robotic appliance also avoids, for example, going down steps and advancing into depressions from which it otherwise could not escape to continue normal movement.

At state 142, the robotic appliance is off (i.e., main power is off and/or the start control has not been activated). Activation of the main power switch and one or more short activations of the control switch cause an "on/off button" transition from the "off state" (state 142) to "on" state 144 where the robotic appliance begins moving forward. From the forward state (state 144), activation of the main power switch to turn the robotic appliance off or a short activation of the control switch to stop the robotic appliance causes an "on/off" transition to the "off" state (state 142). Similarly, if the robotic appliance does not begin moving forward before a timeout occurs, there is a "timeout" transition from the forward state (state 144) to the off state (state 142).

If the joystick sensor detects contact with an obstacle, there is an "any hit" transition from the forward state (state 144) to state 146 where the robotic appliance backs up a small amount. Similarly, if any floor sensor assembly detects a loss of a floor condition, there is an "off edge" transition from the forward state (state 144) to state 148 where the robotic appliance moves backward a larger distance.

The joystick sensor is capable of detecting a direction of contact with an obstacle in relation to a reference system representing the perimeter of the bumper. If, for example, a compass-face reference system is used and normal forward motion is identified as north, a point around the perimeter of the bumper that may come in contact with an obstacle is also identified as north. From that point of reference, northeast, east, southeast, south, southwest, west, and northwest contact around the perimeter of the bumper can also be distinguished. Higher resolution for contact may also be possible. Moreover, alternate reference systems, such as a clock-face reference system or a 360-degree reference system may be implemented. Additionally, alternate control responses can be implemented for obstacles contacted in different distinguishable directions.

With continuing reference to FIG. 6, from state 146, if contact is detected from the northeast or east, a "northeast or east hit" transitions the robotic appliance to state 150 where it begins a small left turn. When contact with an obstacle is detected in the northwest or west direction, it causes a "northwest or west hit" transition from the backup small state (state 146) to state 152 where the robotic appliance begins a small right turn. If the joystick sensor detects contact with an obstacle in the north direction, a "head on hit" transition from the back up small state (state 146) to state 154 occurs and the robotic appliance performs a turn that is randomly selected left or right and between 60 and 120 degrees. During any of turn states 150, 152, or 154, if the floor sensor detects a loss of floor condition, an "off edge" transition to the backup hard state (state 148) occurs. Otherwise, when the small left turn, small right turn, or random turn is completed there is a normal transition back to the forward state (state 144).

From the backup hard state (state 148), if the right forward floor sensor detected the loss of floor condition, there is a "right sensor back" transition to state 156 where the robotic appliance begins a 45-degree left turn. Similarly, if the forward left floor sensor detected a loss of floor condition, there is a "left sensor back" transition from the back up hard state (state 148) to state 158 where the robotic appliance begins a 45-degree right turn. If both forward sensors detected loss of floor conditions, there is a "both sensor back" transition from the backup hard state (state 148) to state 160 where the robotic appliance begins a 90-degree right turn. When the turn states 156, 158, or 160 are completed, there is a normal transition back to the forward state (state 144).

In the backup hard state (state 148), if the robotic appliance does not move back before a timeout period expires, there is a "timeout" transition to state 162 where the robotic appliance stops and enters into an error condition. Similarly, if other error conditions are detected, such as an over-current condition on a brush motor or a drive motor, an interrupt takes the robotic appliance to state 164 for interrupt/error handling and an "error" transition from state 164 to state 162 occurs where the robotic appliance stops. Activation of the main power switch to turn the robotic appliance off causes a transition from the error state (state 162) to the off state (state 142).

With reference to FIGS. 7-10 a process 200 for main control of the robotic appliance begins at step 202 where the main power switch is activated. Next, the main board is initialized and the tri-color indicator is illuminated to indicate power is applied (e.g., illuminated green) (step 204). At step 206, the process waits for the control or start button to be pressed. Once the start button is pressed, the process determines if the start button is still pressed (step 208). If the start button is still pressed, at step 210, the process determines if the start button has been pressed long. The robotic appliance may be equipped to provide one or more spot clean modes of operation. A first spot clean mode can be, for example, a predetermined motion pattern to clean a surface area of 3 feet by 3 feet or 5 feet by 5 feet. If the start button has been pressed long, the process illuminates the tri-color indicator to indicate spot clean operation is selected (e.g., illuminated yellow) and sets a spot clean flag (step 212). Otherwise, the process advances to step 208. At step 208, when the process determines that the start button is not still pressed, the process advances to step 214 where run times are set up. Next, the brush roll motor(s) is/are turned on (step 216). An additional loop similar to steps 206-212 may be used if additional operational modes are incorporated. For example, if normal operation is to run one brush roll motor, a second short activation of the start button may be detected to switch to deep cleaning operation with both brush roll motors operating. Additionally, another spot clean mode may be implemented and initiated by a second long activation of the start button. The second spot clean mode may clean a larger or smaller area and/or use a different predetermined pattern from the first spot clean mode.

Figure 8:
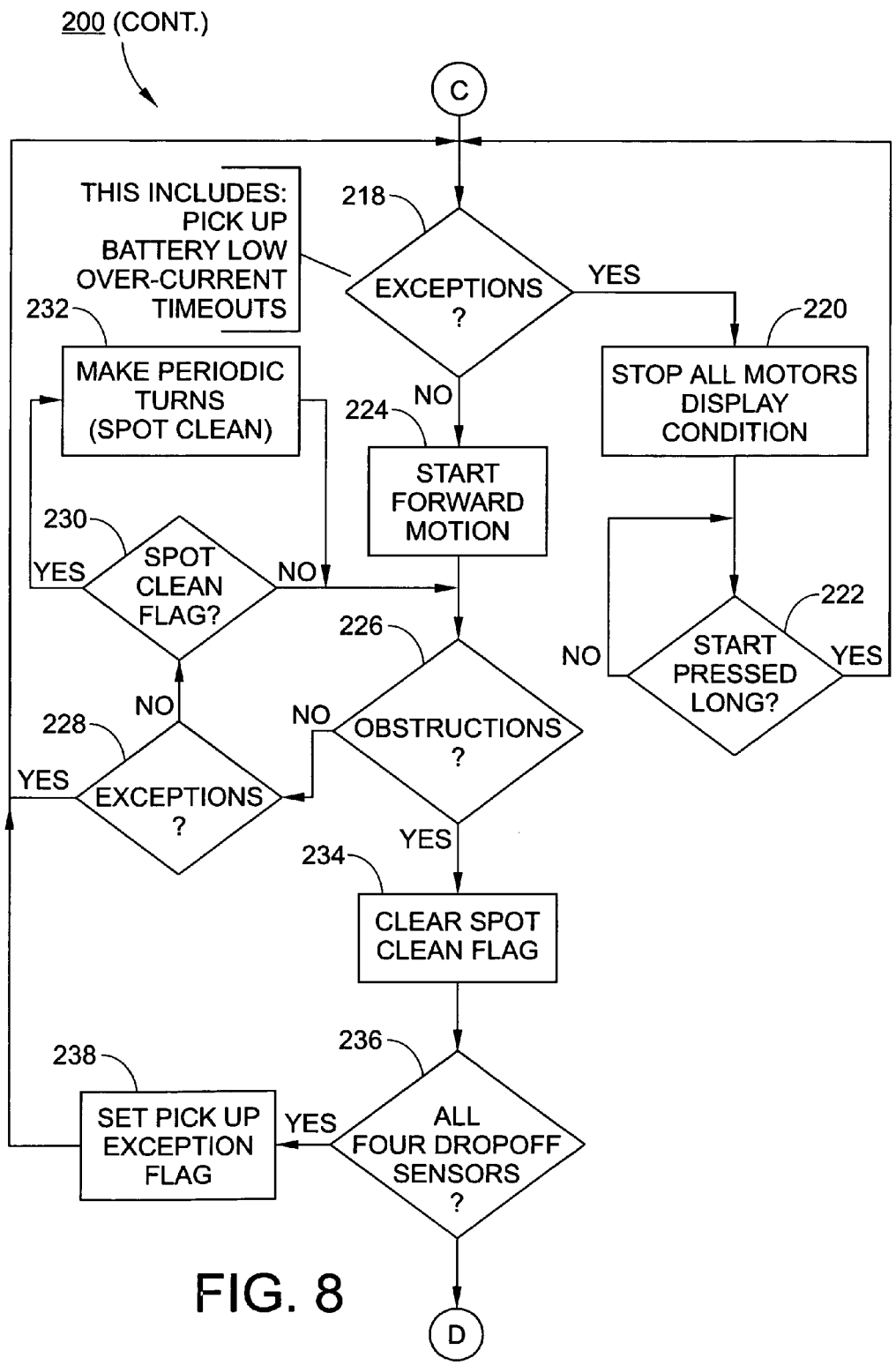

With reference now to FIG. 8, at step 218 the process determines if exceptions must be handled. These exceptions include detection of a pickup condition (i.e., robotic appliance picked up), battery low condition, over-current condition, and timeout condition. If there are exceptions to handle, the process stops all motors and illuminates the tri-color indicator to display an error condition (e.g., illuminated red, possibly flashing) (step 220). Next at step 222, the process waits for the control or start button to be pressed long. When the start button is pressed long, the robotic appliance is reset and the process advances to step 218 to evaluate and handle exceptions.

At step 218, if no exceptions are to be handled, the process continues to step 224 and starts forward motion of the robotic appliance. At step 226, the process determines if there are any obstructions to forward motion. If there are no obstructions, at step 228, the process checks to see if any exceptions require handling. Thus, if no exceptions require handling, at step 230, the process checks if the spot clean flag is set. If the spot clean flag is set the robotic appliance makes periodic turns in accordance with the predetermined pattern to perform the spot clean operation (step 232). If the spot clean flag is not set, the robotic appliance returns to step 226. At step 228, if there are exceptions to be handled the process returns to step 218 to evaluate and handle exceptions.

Figure 9:
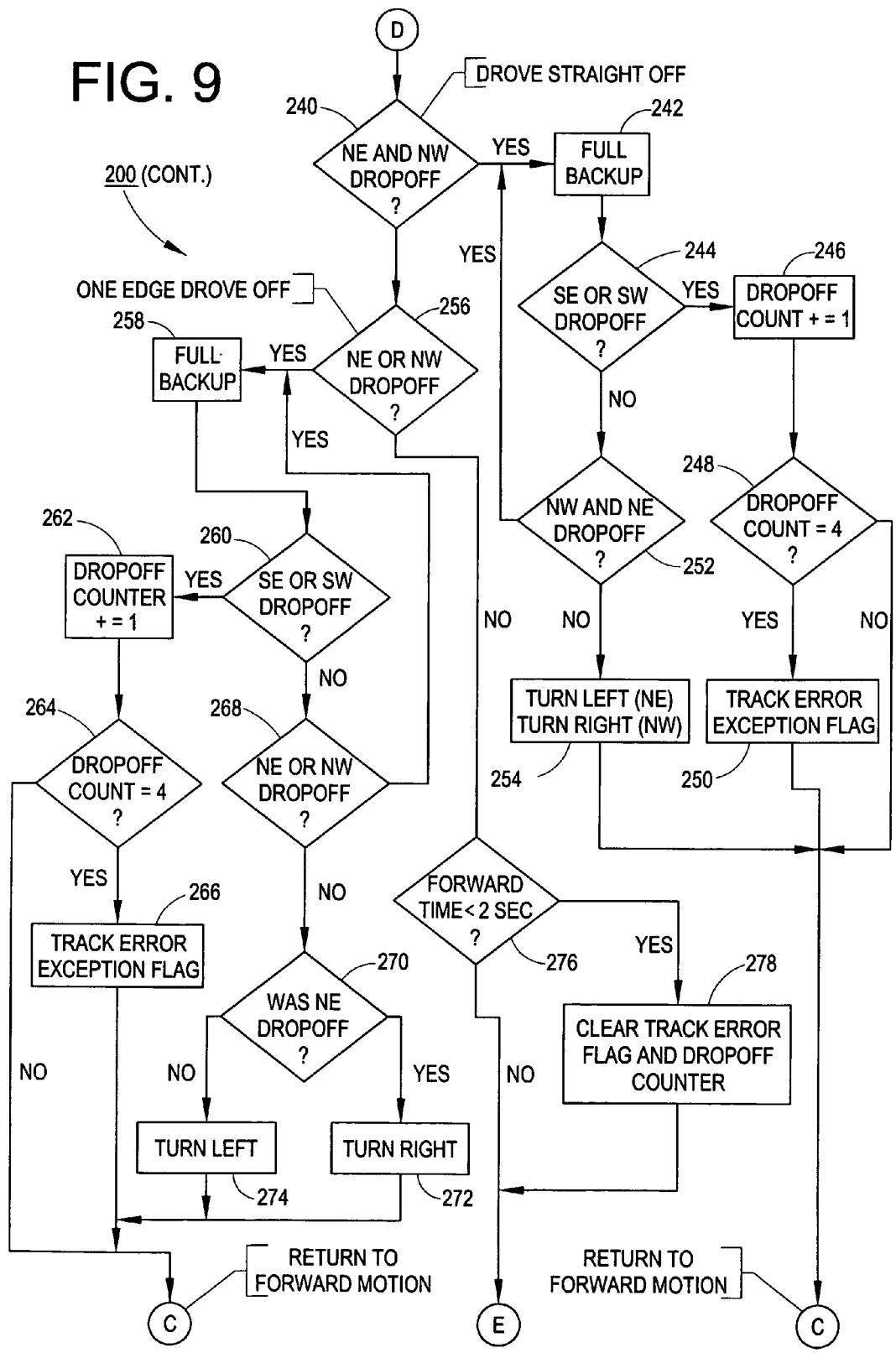

At step 226, if there are obstructions to forward motion, the spot clean flag is cleared (step 234). Next, the process determines if all four drop-off sensors detect a loss of floor condition (step 236). If all four drop-off sensors are detecting a loss of floor condition, the robotic appliance has likely been picked up and the pickup exception flag is set (step 238). When all four drop-off sensors do not detect loss of floor conditions, the process determines if the northeast and northwest drop-off sensors both detect a loss of floor condition (step 240), as shown in FIG. 9. If the northeast and northwest drop-off sensors both detect a loss of floor condition, the process causes the robotic appliance to move in a full back up direction (step 242). Next, the process determines if either the F southeast or southwest drop-off sensors detect a loss of floor condition (step 244). If the southeast or southwest drop-off sensors detect a loss of floor condition, the process implements a drop-off counter by one (1) (step 246). Next, the process determines if the drop-off counter equals four (4) (step 248). When the drop-off counter equals four (4), the track error exception flag is set (step 250) and the process returns to step 218 with an exception condition that will eventually cause stoppage of the robotic appliance. On the other hand, if the drop-off count is not equal to four (4) at step 248, the process returns to step 218 to evaluate and handle exceptions.

At step 244, if neither the southeast nor the southwest drop-off sensors detect a loss of floor condition, the process advances to step 252. Here, the process determines if both the northwest and northeast drop-off sensors detect a loss of floor condition. If the northwest and northeast drop-off sensors do not both detect a loss of floor condition, then, as shown at step 254, the robotic appliance turns left for a northeast drop-off sensor detecting a loss of floor condition or right for a northwest drop-off sensor detecting loss of floor condition and the process returns to step 218 to evaluate and handle exceptions. If no exceptions are identified, the process eventually switches to forward motion. If the northwest and northeast drop-off sensors both detect a loss of floor condition at step 252, the process returns to step 242 to initiate a full backup.

With continued reference to FIG. 9, at step 240, if the northeast and northwest drop-off sensors do not both detect loss of floor conditions, the process determines if either the northeast or northwest drop-off sensors detect a loss of floor condition (step 256). If the northeast or northwest drop-off sensors detect a loss of floor condition, the robotic appliance moves in a full back up direction (step 258). Next, the process determines if the either the southeast or southwest drop-off sensors detect a loss of floor condition (step 260). If the southeast or southwest drop-off sensors detect a loss of floor condition, the process increments a drop-off counter by one (1) (step 262). Next, the process determines if the drop-off counter equals four (4) (step 264). If the drop-off counter equals four (4), the process sets a track error exception flag (step 266) and returns to step 218 with an exception condition that will eventually cause stoppage of the robotic appliance. When the drop-off counter is not equal to four (4) at step 264, the process returns to step 218 to evaluate and handle exceptions. If no exceptions are identified, the process eventually switches to forward motion.

At step 260, if neither the southeast nor southwest drop-off sensors detect a loss of floor condition, the process determines if either the northeast or northwest drop-off sensors detect a loss of floor condition (step 268). If neither the northeast nor northwest drop-off sensors detect a loss of floor condition, the process determines if the northeast drop-off sensor detected a loss of floor condition (step 270). If the northeast drop-off sensor detected a loss of floor condition, the robotic appliance turns right (step 272) and returns to step 218 to evaluate and handle exceptions. However, if the northeast drop-off sensor did not detect a loss of floor condition at step 270, the robotic appliance turns left (step 274) and the process returns to step 218 to evaluate and handle exceptions. At step 268, if the northeast or northwest drop-off sensors detected a loss of floor condition, the process returns to step 258 to initiate a full backup.

Figure 10:
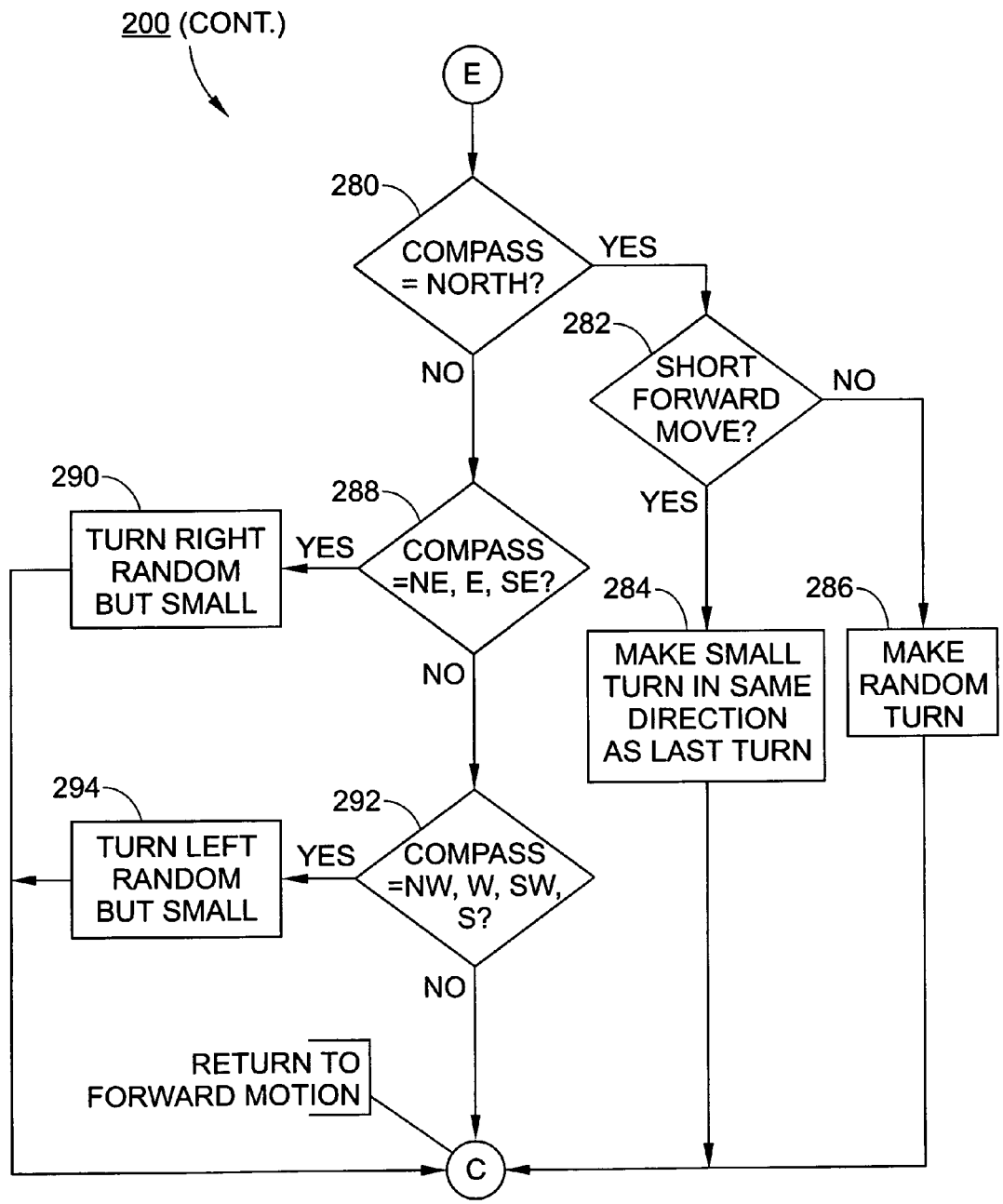

At step 256, if neither the northeast nor northwest drop-off sensors detect a loss of floor condition, the process determines if forward time is greater than, for example, two seconds (step 276). If forward time is greater than two seconds, the process clears the track error flag and the drop-off counter (step 278) and advances to step 280 (FIG. 10). At step 276; if the forward time is not less than two seconds, the process advances to step 280 without clearing the track error flag or the drop-off counter.

With reference now to FIG. 10, at step 280, the process determines if the compass is set to north. If the compass is set to north, the process determines whether there should be a short forward motion for the current situation (step 282). If there should be a short forward motion, the robotic appliance makes a small turn in the same direction as the last turn (step 284) and returns to step 218 to evaluate and handle exceptions. If the current situation dictates that there should not be a short forward motion, the robotic appliance makes a random turn (step 286) and returns to step 218 to evaluate and handle exceptions. At step 280, if the compass does not read north, the process advances to step 288 and determines if the compass reads northeast, east, or southeast. If so, the robotic appliance begins a small random right turn (step 290) and returns to step 218 to evaluate and handle exceptions. On the other hand, if the compass does not read northeast, east, or southeast, the process advances to step 292 and determines if the compass reads northwest, west, southwest, or south. If so, the robotic appliance begins a small random left turn (step 294) and returns to step 218 to evaluate and handle exceptions. If not, the process simply returns to step 218 to evaluate and handle exceptions.

Figure 11:
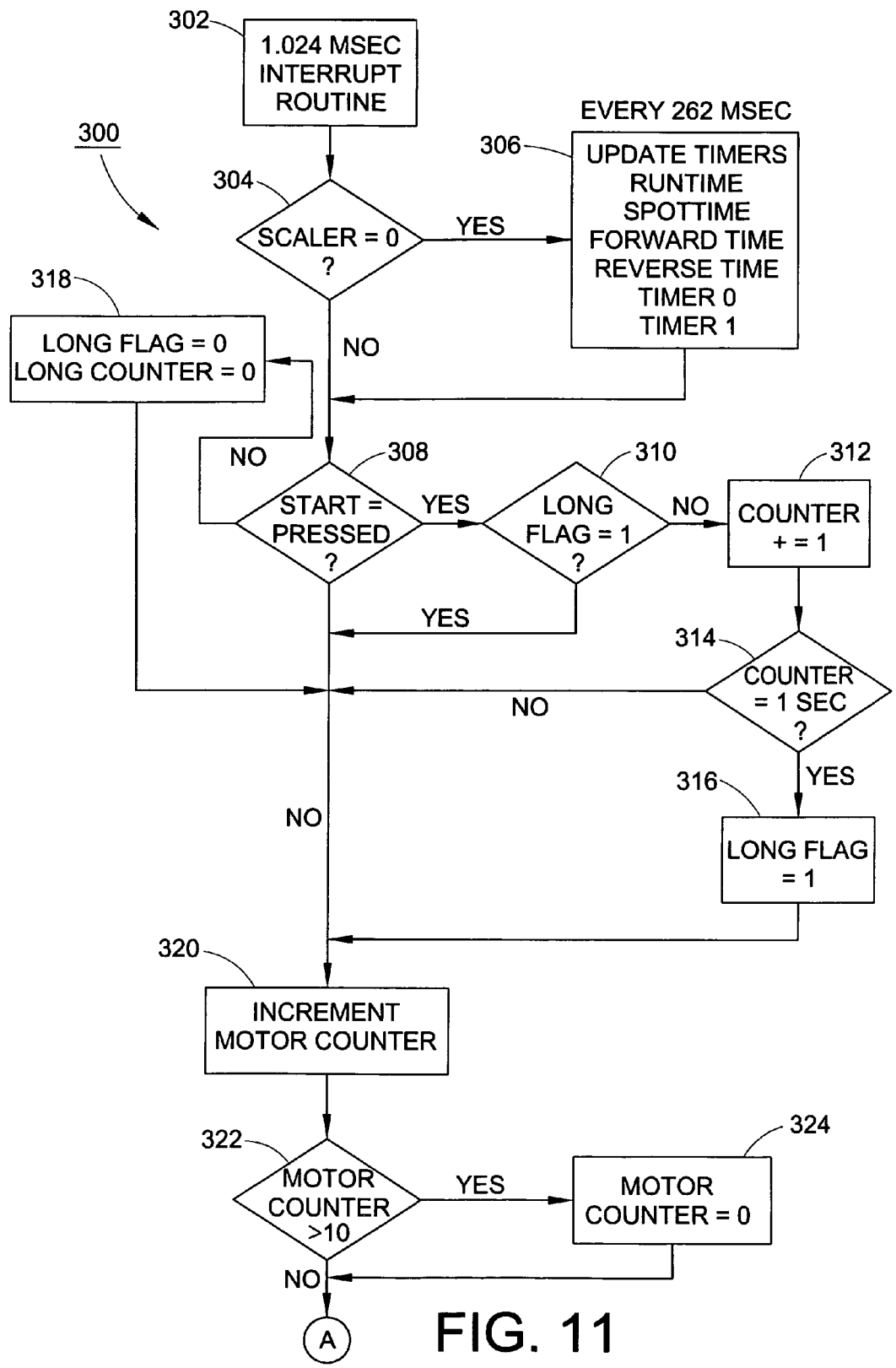
FIGS. 11-13 are sections of a flow chart showing an interrupt handling routine for various interrupts and error conditions associated with an embodiment of a robotic appliance according to the present invention.
Figure 12:
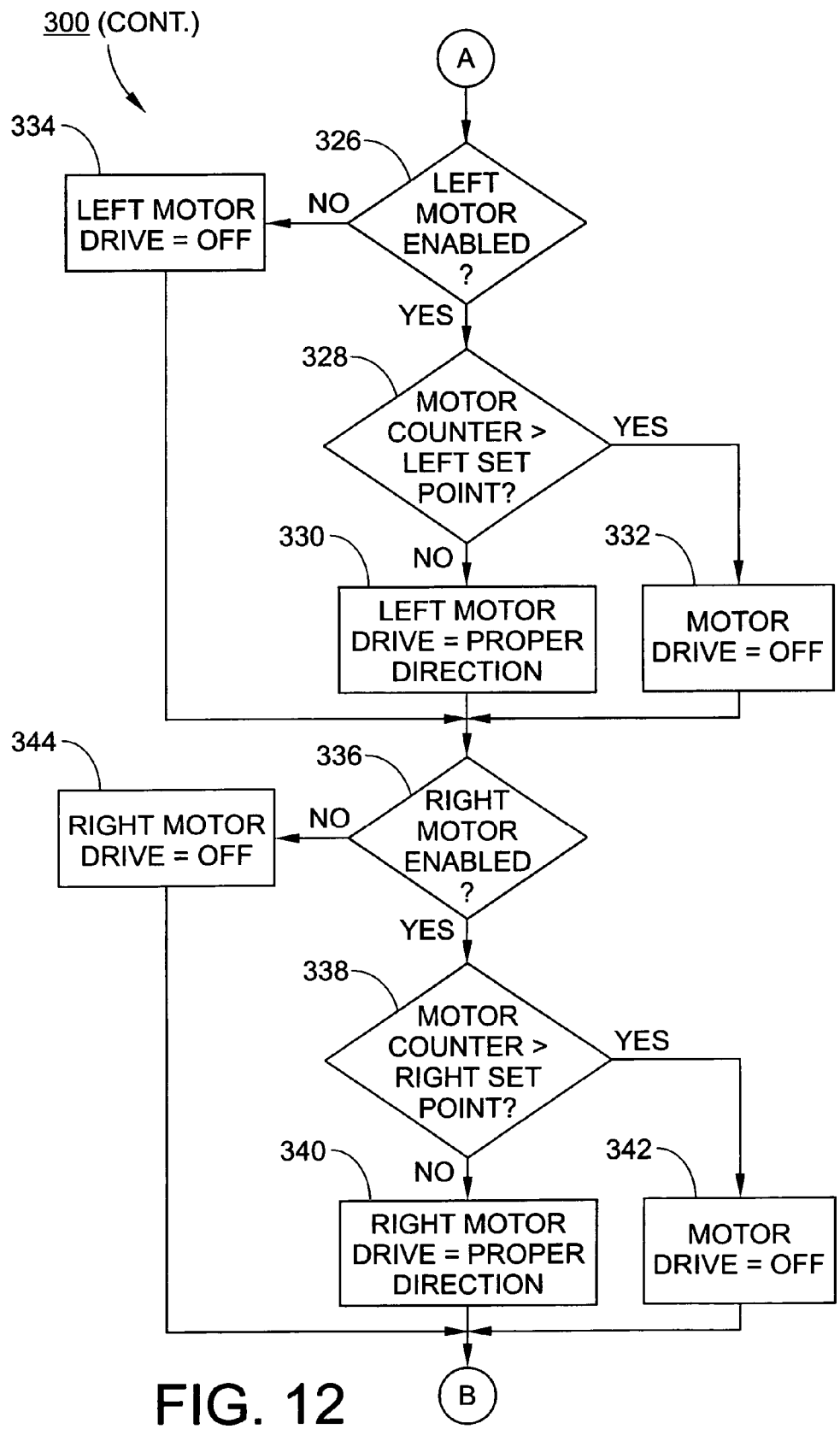
Figure 13:
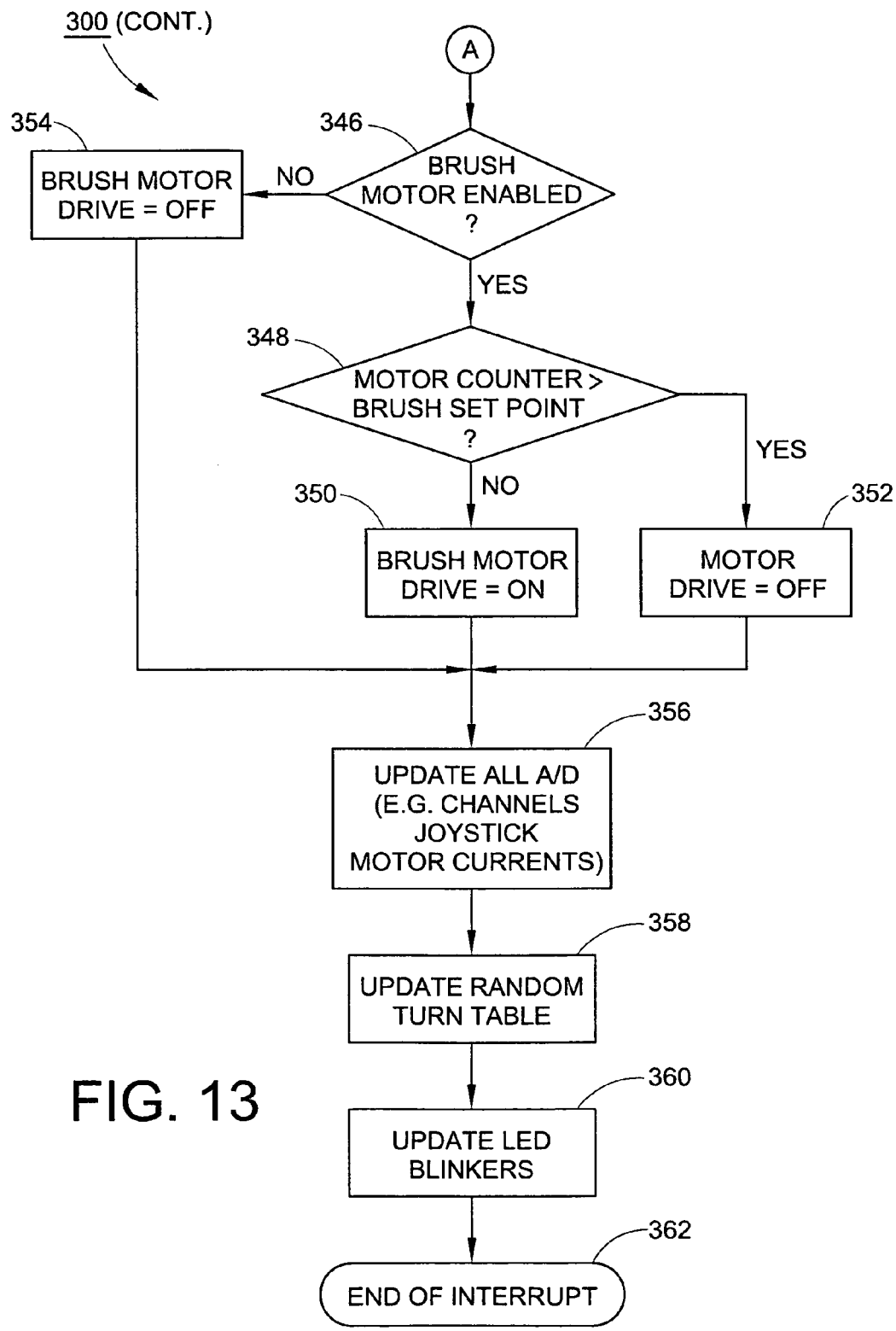

With reference to FIGS. 11-13, an interrupt handling routine 300 begins at step 302. The process determines if a scalar value is equal to 0 (step 304). If the scalar value is equal to 0, the process updates its timers (e.g., run time, spot time, forward time, reverse time, timer0, timer1) (step 306). If the scalar value is not 0, the process determines if the control or start button is pressed (step 308). If the start button is pressed, the process determines if the long flag equals 1 (step 310). When the long flag is not equal to 1, the process increments a counter by 1 (step 312). Next, the process determines if the counter is equal to 1 second (step 314). If so, the long flag is set equal to 1 (step 316).

At step 308, if the start button is not pressed, the process sets the long flag equal to zero (0) and the long counter equal to zero (0) (step 318) and advances to step 320. At step 310, if the long flag is equal to one (1), the process advances to step 320. At step 314, if the counter is not equal to one (1) second, the process advances directly to step 320.

At step 320, the process increments the motor counter. Next, the process determines if the motor counter is greater than ten (10) (step 322). If the motor counter is greater than ten (10), the process sets the motor counter equal to zero (0) (step 324). On the other hand, if the motor counter is not equal to ten (10), the process advances to step 326.

With reference now to FIG. 12, at step 326, the process determines if the left motor is enabled. If the left motor is enabled, the process determines if the motor counter is greater than the left set point (step 328). If the motor counter is not greater than the left set point, the process sets the left motor drive equal to the proper direction (step 330) and advances to step 336. If the motor counter is greater than the left set point, the process sets the motor drive equal to off (step 332) and advances to step 336. At step 326, if the left motor is not enabled, the process sets the left motor drive equal to off (step 334) and advances to step 336.

Following steps 330, 332, or 334, the process determines if the right motor is enabled (step 336). If the right motor is enabled, the process determines if the motor counter is greater than the right set point (step 338). If the motor counter is not greater than the right set point, the process sets the right motor drive equal to the proper direction (step 340) and advances to step 346. If the motor counter is greater than the right set point, the process sets the motor drive equal to off (step 342) and advances to step 346 (FIG. 13). At step 336, if the right motor is not enabled, the process sets the right motor drive equal to off (step 344) and advances to step 346.

With reference now to FIG. 13, following steps 340, 342, or 344, the process determines if the brush motor is enabled (step 346). If the brush motor is enabled, the process determines if the motor counter is greater than the brush set point (step 348). When the motor counter is not greater than the brush set point, the process sets the brush motor drive equal to on (step 350) and advances to step 356. However, if the motor counter is greater than the brush set point, the process sets the motor drive equal to off (step 352) and advances to step 356. At step 346, if the brush motor is not enabled, the process sets the brush motor drive equal to off (step 354) and advances to step 356.

After steps 350, 352, or 354, the process updates all analog-to-digital (A/D) channels for the joystick sensor and motor current sensors (step 356). Next, the process updates the random turn table (step 358). At step 360, the process updates the LED blinkers. At this point, the interrupt process has reached its end (step 362).

Figure 14:
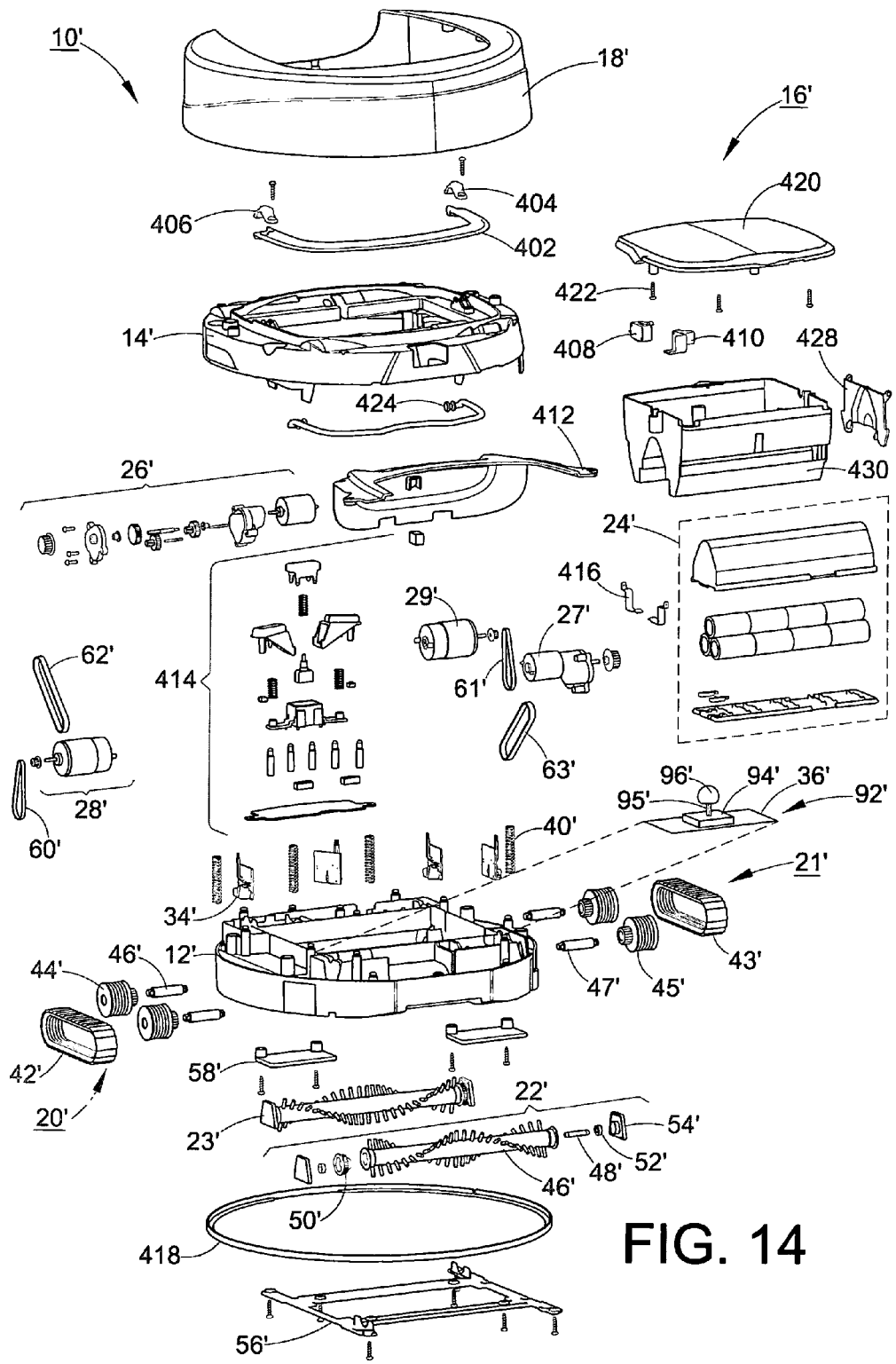
FIG. 14 is an exploded perspective view of another embodiment of a robotic appliance with an on-board joystick sensor and equipped to function as a sweeper, according to the present invention.

With reference to FIG. 14, another embodiment of a robotic appliance 10' is illustrated. In this embodiment, like components are identified by like numerals with a primed (')

suffix and new components are identified by new numerals. The robotic appliance 10' is equipped to function as a robotic sweeper and includes a base 12' and a base cover 14' secured to the base 12'. A dirt cup assembly 16' is received by the base cover 14' and base 12'. A bumper 18' floats above the base cover 14'. First and second traction means, such as first and second drive belt/tread assemblies 20', 21', and first and second cleaning means, such as first and second brush roll assemblies 22', 23', are mounted to the base 12'. Alternatively, for example, the traction means can be wheel assemblies that operate in conjunction with one or more additional swiveling/balancing wheel assemblies or rollers. Alternatively, for example, the cleaning means can be a stationary or vibrating brush or a mop head system with a replaceable mopping cloth. A battery pack 24', first and second drive motors 26', 27', and first and second brush roll motors 28', 29' can be mounted to the base 12'. Also, first, second, third, and fourth floor sensor assemblies 34' and main PCB assembly 36' can be mounted to the base 12'. For example, the aforementioned elements can be installed between the base cover 14' and base 12'. First, second, third, and fourth bumper springs 40 can be received by bosses, sockets, studs, or projections in the base 12', extend through the base cover 14' toward the bumper 18', and can be received by corresponding bosses, sockets, studs, or projections in the bumper 18'. In an alternate embodiment, the bumper 18' can be formed by multiple sections. For example, two half-sections or four quadrant-sections.

The first drive belt/tread assembly 20" can include a drive belt/tread 42, first and second drive pulleys 44', and first and second drive pins 46'. The drive belt/tread 42' fits around the first and second drive pulleys 44'. Each drive pin 46' is received by a corresponding drive pulley 44' and extends toward to the base 12'. The first and second drive pins 46' in each drive belt/tread assembly 20' are received by the base 12' from the side and/or bottom. Likewise, the second drive belt/tread assembly 21' can include a drive belt/tread 43', first and second drive pulleys 45', and first and second drive pins 47'.

If desired, each brush roll assembly 22', 23' can include a brush roll dowel assembly 46', a brush roll shaft 48' extending through the center of the brush roll dowel assembly 46', a brush roll sprocket 50' positioned at one end of the brush roll dowel assembly 46', first and second brush bearings 52' positioned at opposing ends of the brush roll shaft 48', and first and second end caps 54' fitted to the brush bearings 52'. The first and second brush roll assemblies 22', 23' can be received by the base 12' from the bottom. A nozzle guard 56' is fitted over the brush roll assemblies 22', 23' to direct dirt and dust toward the dirt cup assembly 16'. First and second bottom brackets 58' are attached to the bumper 18' to cooperate with cavities in the base 12' to guide and restrict horizontal movement of the base 12' in relation to the bumper 18' when the bumper 18' comes in contact with an obstacle.

A first brush roll belt 60' can extend from the first brush roll motor 28' to the brush sprocket 50' on the first brush roll assembly 22'. Likewise, the second brush roll belt 61' can extend from the second brush roll motor 29' to a brush sprocket on the second brush roll assembly 23'. The first and second brush roll motors 28', 29' can be operated to turn the brush roll assemblies 22' in opposite directions so that both brush roll assemblies 22' direct dirt and dust inwardly toward the dirt cup assembly 16'. The brush roll motors 28', 29' may be variable speed, reversible, and independently controlled. For example, the brush roll motors 28', 29' may be reversed to remove clogged material from the dirt path.

A first drive belt 62' can extend from the first drive motor 26' to one of the drive pulleys 44' within the first drive belt/tread assembly 20'. Likewise, the second drive belt 63' can extend from the second drive motor 27' to one of the drive pulleys 45' within the second drive belt/tread assembly 21'. In this embodiment, the drive motors 26', 27' are variable speed, reversible, and independently controlled. For example, the first and second drive motors 26' may be simultaneously operated at different speeds and may also be simultaneously operated in different directions to both drive and steer the robotic appliance 10'. In an alternate embodiment, one or more wheels may be linked to an actuator that is independently controlled and in conjunction with the drive means provides steering.

With continuing reference to FIG. 14, a carrying handle 402 is secured to the base cover 14' by left carrying handle clamp 404 and right carrying handle clamp 406. The carrying handle 402 permits a user to lift and carry the robotic appliance 10'. A safety micro switch 408 may be received by a safety switch mount 410. The safety switch mount 410 may be mounted to the base cover 14' or base 12' and positioned so that the safety micro switch 408 is activated when the dirt cup assembly 16' is properly installed in the robotic appliance 10'. For example, the dirt cup assembly 16' may include a rib or projection that corresponds with an activation mechanism on the safety micro switch 408. The dirt cup assembly 16' may be received through guides in the base cover 14' or base 12' and snap into place to secure it to the base 12' and/or base cover 14'. A control/indicator PCB cover 412 may be mounted to the base 12' to secure a control/indicator PCB assembly 414 between the base 12' and base cover 14' with switch activation mechanisms extending from the control/indicator PCB assembly 414 toward the bumper 18'. First and second battery pack contacts 416 may be mounted to the base 12' and positioned to make contact with corresponding terminals on the battery pack 24'. A bumper support ring 418 may be mounted to the bumper 18' along a lower portion to stiffen the bumper 18' and reduce flexing when coming in contact with an obstacle.

An embodiment of the dirt cup assembly 16' can include a dirt cup top 420, screws 422, a dirt cup carrying handle 424, a dirt cup door 428, and a dirt cup housing 430. The dirt cup top 420 may be secured to the dirt cup housing 430 with the screws 422. The dirt cup carrying handle 424 may be secured to the dirt cup assembly 16' in any suitable manner. The dirt cup carrying handle 424, for example, permits a user to lift the dirt cup assembly 16' out of the robotic appliance 10', carry and hold the dirt cup assembly 16', and lower the dirt cup assembly 16' into the robotic appliance 10'. The dirt cup door 428 may be mounted to the dirt cup housing 430 along, for example, an upper pivoting side and closed by a known latching mechanism along, for example, a lower latched side.

In the embodiment being described, the dirt cup housing 430 collects dirt and dust when the dirt cup assembly 16' is installed and the robotic appliance 10' is operating. The safety micro switch 408 is adapted to detect when the dirt cup assembly 16' is properly installed and serve as a safety interlock for proper operation. Micro switch model no. DMC-1115 manufactured by Defond of Hong Kong, for example, may be used as the safety micro switch 408. Typically, when the safety micro switch 408 is not activated the motors are disabled. For example, the motors associated with motion (i.e., 26', 27') and cleaning (i.e., 28', 29') are disabled if the dirt cup assembly 16' is not properly installed. The dirt cup housing 430 can be emptied by removing the dirt cup assembly 16' from the robotic appliance 10', opening the dirt cup door 428, and dumping the dirt cup assembly 16' so that the dirt and dust contained therein is directed through an opening in the dirt cup housing 430 corresponding to the open dirt cup door 428 into a waste receptacle.

Figure 23:
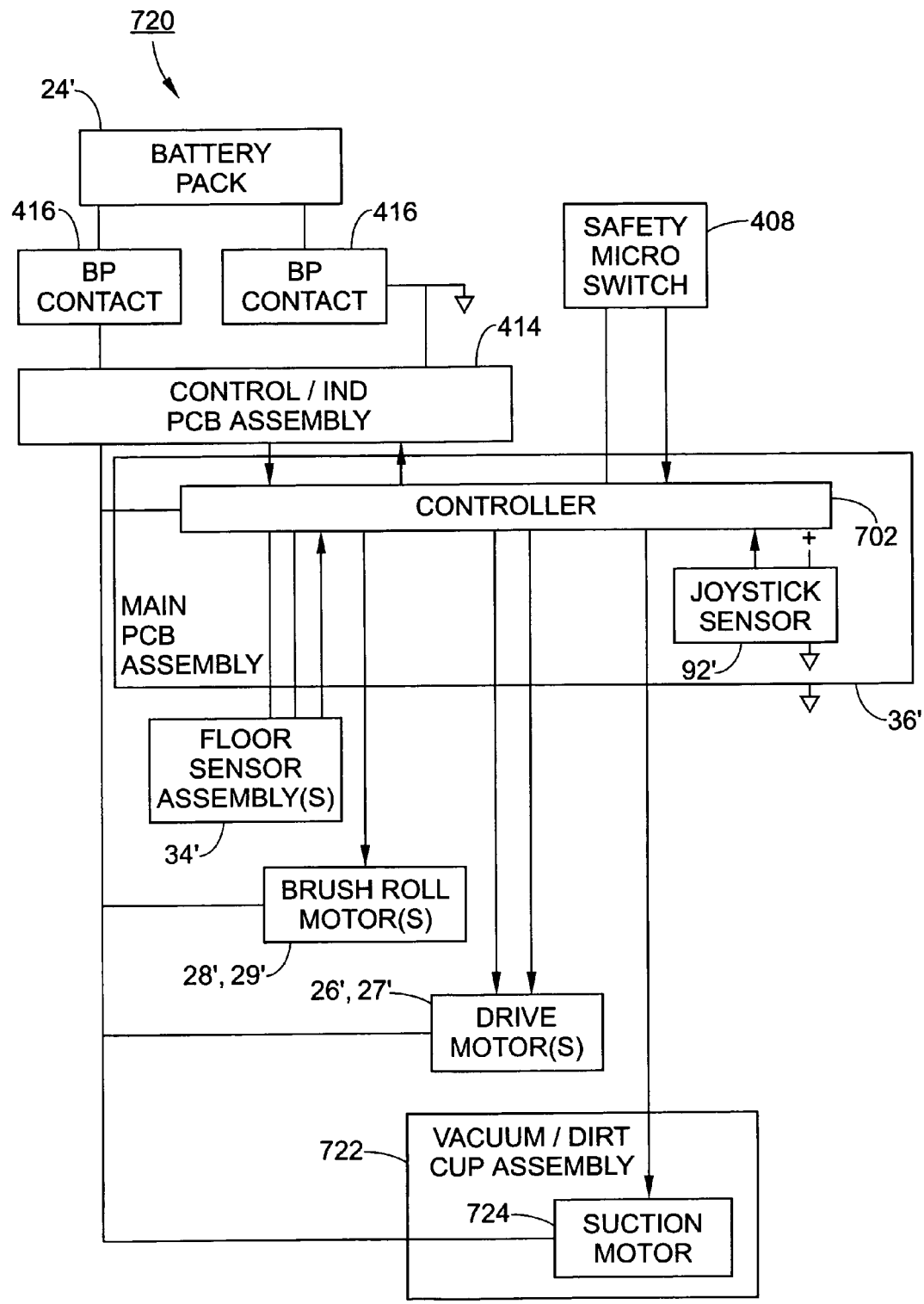
FIG. 23 is electrical block diagram of an embodiment of a robotic appliance similar to the robotic appliance depicted in FIG. 14.

In an alternate embodiment, the dirt cup assembly 16' may be replaced with a vacuum/dirt cup assembly 722 (FIG. 23) which converts the robotic appliance 10' from a robotic sweeper to a robotic vacuum cleaner. The brush roll assemblies 22', 23' are optional in the robotic vacuum cleaner configuration. In additional embodiments, the robotic appliance 10' (e.g., robotic sweeper or vacuum cleaner) may equipped with only the first brush roll assembly 22', rather than the two brush roll assemblies 22', 23' described above. As another embodiment, the robotic appliance 10' may be equipped with a floor mop module in place of the brush roll assemblies 22', 23' and dirt cup assembly 16'. The floor mop module may include a mop head system with a replaceable mopping cloth. In further embodiments the floor mop module may also include a cleaning fluid distribution system.

Figure 15:
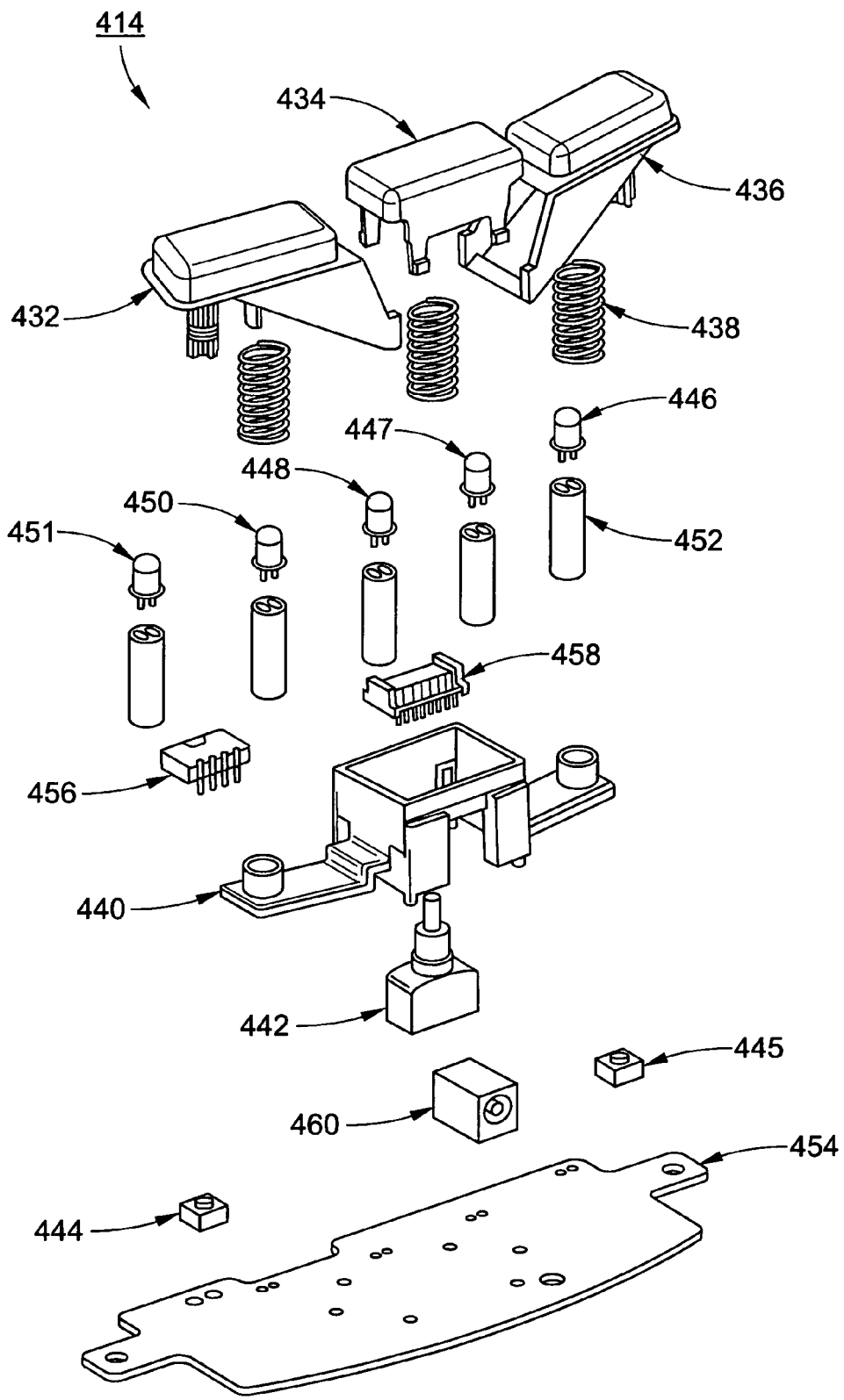
FIG. 15 is an exploded perspective view of a control/indicator PCB assembly associated with the robotic appliance of FIG. 14.

With reference to FIG. 15, the control/indicator PCB assembly 414 may include a mode button 432, a power button 434, a start button 436, and first, second, and third switch springs 438. The first, second, and third switch springs 438 are respectively associated with the mode, power, and start buttons 432, 434, 436. The switch springs 438 are received in a switch bracket 440. The switch bracket 440 may be adapted to fit over a latching pushbutton switch 442 associated with the power button 434 and first and second momentary pushbutton switches 444, 445 associated with the mode and start buttons 432, 436, respectively. The latching pushbutton switch 442 may be activated by depressing the power button 434. The first momentary pushbutton switch 444 may be activated by depressing the mode button 432. The second momentary pushbutton switch 445 may be activated by depressing the start button 436. The switch springs 438 may resiliently bias the buttons 432, 434, 436 to return them to a normal position after the corresponding button is released.

The control/indicator PCB assembly 414 may also include first and second yellow indicators 446, 447 (e.g., yellow LEDs), a green indicator 448 (e.g., green LED), and first and second red indicators 450, 451 (e.g., red LEDs). Each indicators 446, 448, 449, 450, 451 is received by a spacer socket 452. A control/indicator board 454 may receive the switch bracket 440, latching pushbutton switch 442, first and second momentary pushbutton switches 444, 445, spacer sockets 452, a 4-pin wire-to-board header 456, an 8-pin wire-to-board header 458, and an AC power charging jack 460.

When the robotic appliance 10' is fully assembled, in the embodiment being described, the buttons 423, 434, 436 on the control/indicator PCB assembly 414 are accessible from the top of the robotic appliance 10' through a cutaway area of the bumper 18'. Similarly, in the embodiment being described, the indicators 446, 447. 448, 450, 451 on the control/indicator PCB assembly 414 are exposed through a cutaway area of the bumper 18' and can be seen from perspectives having a field of view of that portion of the top of the robotic appliance 10'.

Figure 22:
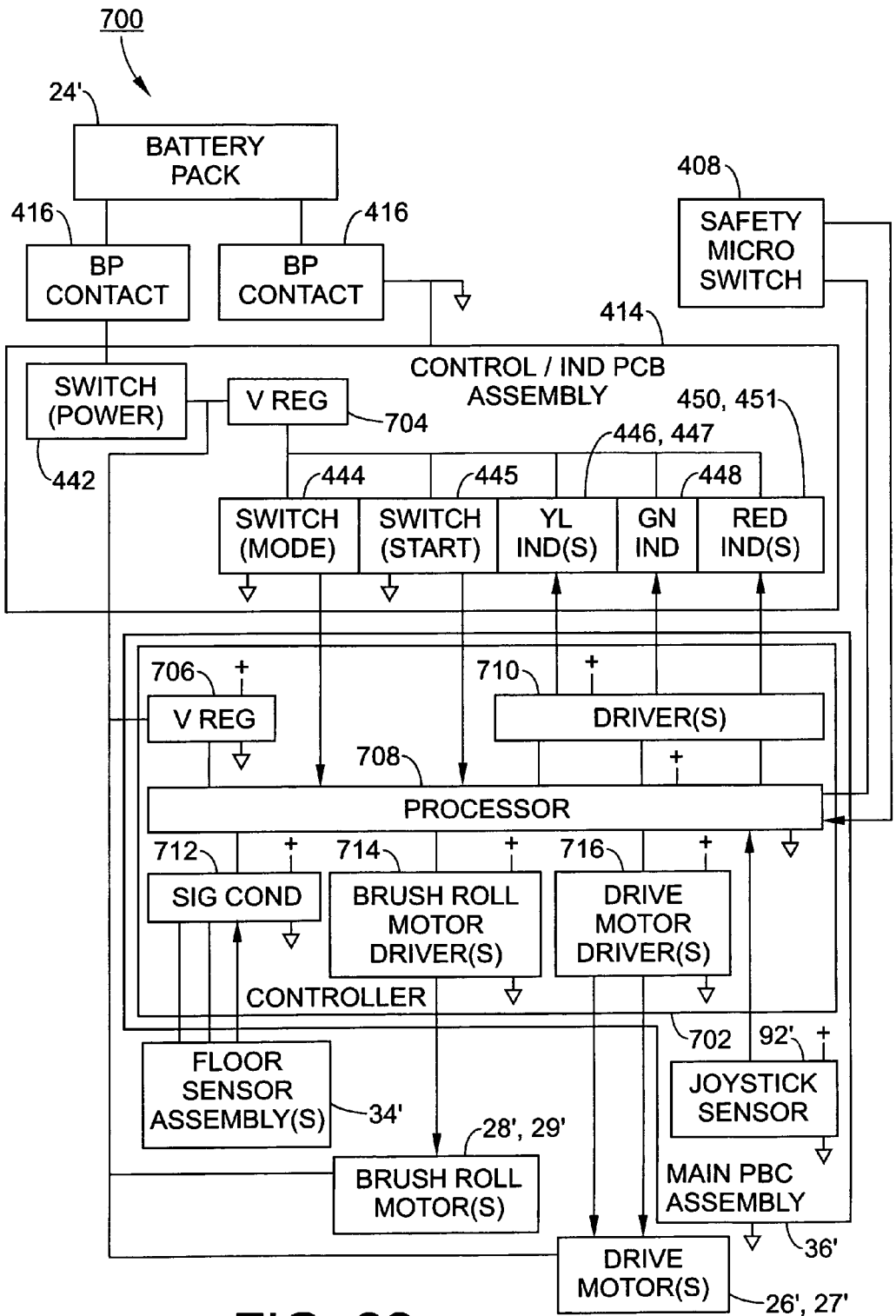
FIG. 22 is an electrical block diagram of the embodiment of the robotic appliance depicted in FIG. 14.

With reference to FIG. 22, an electrical block diagram 700 of the robotic appliance 10' (FIG. 14) shows that battery pack 24' may provide power to the first and second battery pack contacts 416. The first battery pack contact 416, for example, may further provide power to the latching pushbutton switch 442 of the control/indicator PCB assembly 414. The latching pushbutton switch 442, for example, is associated with the power button 434 (FIG. 15) and used as a power switch. When the latching pushbutton switch 442 is closed, power may be distributed to first and second drive motors 26', 27', first and second brush roll motors 28', 29', a voltage regulator circuit 702 in a controller 704 of the main PCB assembly 36', and a voltage regulator circuit 706 in the control/indicator PCB assembly 414. The voltage regulator circuit 702 distributes regulated power to other circuits/components of the controller 702, such as a processor 708, driver circuit(s) 710, a signal conditioner circuit 712, brush roll motor driver circuit(s) 714, and drive motor driver circuit(s) 716. The voltage regulator circuit 706 distributes regulated power to other circuits/components of the control/indicator PCB assembly 414, such as first and second momentary pushbutton switches 444, 445, yellow indicator(s) 446, 447, green indicator 448, and red indicator(s) 450, 451.

The processor 708 may also be in communication with the joystick sensor 92' of the main PCB assembly 36', safety micro switch 408, first and second momentary pushbutton switches 444, 445 of the control/indicator PCB assembly 414 (e.g., the first momentary pushbutton switch 444 being associated with the mode button 432 (FIG. 15) and the second momentary pushbutton switch 445 being associated with the start button 436 (FIG. 15)), driver circuit(s) 710, signal conditioning circuit 712, brush roll motor driver circuit(s) 714, and drive motor driver circuit(s) 716. The driver circuits 710 drive signals to control the indicators 446, 447, 448, 450, 451 of the control/indicator PCB assembly 414. The signal conditioning circuit 712 provides power and conditions a sensed signal from each of the first, second, third, and fourth floor sensor assemblies 34'. The brush roll motor driver circuit(s) 714 drive signals to independently control the first and second brush roll motors 28', 29'. The drive motor driver circuit(s) 716 drive signals to independently control the first and second drive motors 26', 27' in either direction. The first momentary pushbutton switch 444, for example, functions as a mode selection switch. The second momentary pushbutton switch 445, for example, functions as a start switch. The controller 704 may control the first and second drive motors 26', 27', first and second brush roll motors 28', 29', and indicators 446, 447, 448, 450, 451 based on the length and/or sequence of activations of the first momentary pushbutton switch 444, activation of the second momentary pushbutton switch 445, the condition of signals from the first, second, third, and fourth floor sensor assemblies 34', the condition signals from the joystick sensor 92' within the main PCB assembly 36', and/or the condition of a signal from the safety micro switch 408.

With reference to FIGS. 6, 14, and 15, the exemplary state diagram 140 identifies various operational states of the robotic appliance 10'. Generally, operation of the robotic appliance 10' includes control of movement (e.g., first and second drive belt/tread assemblies 20', 21') and control of the cleaning implement (e.g., first and second brush roll assemblies 22', 23'). More specifically, operation of the first and second drive motors 26', 27' and first and second brush roll motors 28', 29' is controlled by the main PCB assembly 36' in response to certain activations of the switches 442, 444, 4445 on the control/indicator PCB assembly 414 and detection of certain conditions by the first, second, third, or fourth floor sensor assemblies 34' and joystick sensor assembly 92'. The latching pushbutton switch 442, for example, may be a two-position latching pushbutton switch that functions as a main power switch. Thus, depressing the power button 434 causes alternating activations of the latching pushbutton switch 442 to turn main power on and off. When main power is initially turned on, the green indicator 448, for example, may be illuminated. Illumination of the green indicator 448 may also indicate that a default or normal mode is selected, such as cleaning with the first brush roll assembly 22'. Conversely, when main power is off, the indicators are extinguished.

The first momentary pushbutton switch 444 may be for selection between various operating modes of the robotic appliance 10'. Thus, when the mode button 432 is pressed to activate the first momentary pushbutton switch 444, the main PCB assembly 36' detects each activation and may distinguish between a short activation and a long activation. For example, a single short activation of the first momentary pushbutton switch 444 may cause the robotic appliance 10' to switch its mode of operation between the normal or default mode (e.g., one-brush operation) to a deep cleaning mode (e.g., two-brush operation). In other words, if the robotic appliance 10' is currently in the normal or default mode, one short activation causes the robotic application 10' to switch to the deep cleaning mode. Conversely, if the robotic appliance 10' is currently in the deep cleaning mode, one short activation causes the robotic application 10' to switch to the normal or default mode. When deep cleaning mode is selected, the first yellow indicator 446 may be illuminated and the green indicator 448 extinguished.

A single long activation of the first momentary pushbutton switch 444 may cause the robotic appliance 10' to switch to a first specialty mode, such as a narrow range spot clean operation in a pre-selected pattern. When the first specialty mode is selected, the second yellow indicator 447 may be illuminated. The first specialty mode may be used in either normal or deep cleaning. Thus, the second yellow indicator 447 may be illuminated along with either the green indicator 448 or the first yellow indicator 446 when the first specialty mode is selected.

Two or more long activations within a predetermined time may cause the robotic appliance 10' to switch to a second specialty mode, such as a wider range and/or a different pre-selected pattern for spot clean operation. When the second specialty mode is selected, the first red indicator 450 may be illuminated. The second specialty mode may be used in either normal or deep cleaning. Thus, the first red indicator 450 may be illuminated along with either the green indicator 448 or the first yellow indicator 446 when the second specialty mode is selected.

The main PCB assembly 36' may be adapted to any suitable combination of short and long activations to create initiate normal cleaning or deep cleaning in either of the specialty modes. Of course, any sequence of short and long activations that is suitable to an operator and distinguishable by the main PCB assembly 36' may be implemented. Similarly, various durations of activation that are distinguishable by the main board may be the basis for controlling different operations.

Additionally, activation of the second momentary pushbutton switch 445 toggles between starting operation of the robotic appliance 10' in the currently selected operating mode and stopping operation. In other words, if the robotic appliance 10' is currently on, but not operating, activation of second momentary pushbutton switch 445 causes the robotic application 10' start operating. Conversely, if the robotic appliance 10' is currently operating, activation of the second momentary pushbutton switch 445 causes the robotic application 10' to stop operating. When operations are started, the drive motors 26' and brush roll motors 28' are controlled by the main PCB assembly 36' based on the currently selected operating mode.

As described above, the robotic appliance 10' may also include components (not shown) to detect errors such as motor over-current conditions, timeouts, when the appliance has been picked up, and low battery conditions. When a low battery condition is detected, the main PCB assembly 36' stops operation of the robotic appliance 10' may illuminate the first red indicator 450 and extinguish the green indicator 448 and yellow indicators 446. At this point, the operator can connect a suitable adapter between a standard AC utility power receptacle and the AC power charging jack 460 to recharge the battery pack 24'. Alternatively, the robotic appliance 10' may be designed to use DC power for charging and include a DC power charging jack in place of the AC power charging jack 460. In this case, a suitable AC/DC converter may be connected between a standard AC utility power receptacle and the DC power charging jack to recharge the battery pack 24'. Of course, another option is to connect a suitable adapter between a DC power source and the DC power charging jack.

When other types of error conditions are detected, the main PCB assembly 36' stops operation of the robotic appliance 10' and may illuminate the second red indicator 450 and extinguish the other indicators 446, 448, 450. Alternatively, the main PCB assembly 36' may distinguish between other types of error conditions by illuminating the second red indicator 450 in combination with one or more of the other indicators 446, 448, 450. The main PCB assembly 36' may further distinguish between types of error conditions by flashing one or more indicators in various combinations of indicators illuminated along with the second red indicator 450.

Figure 16:
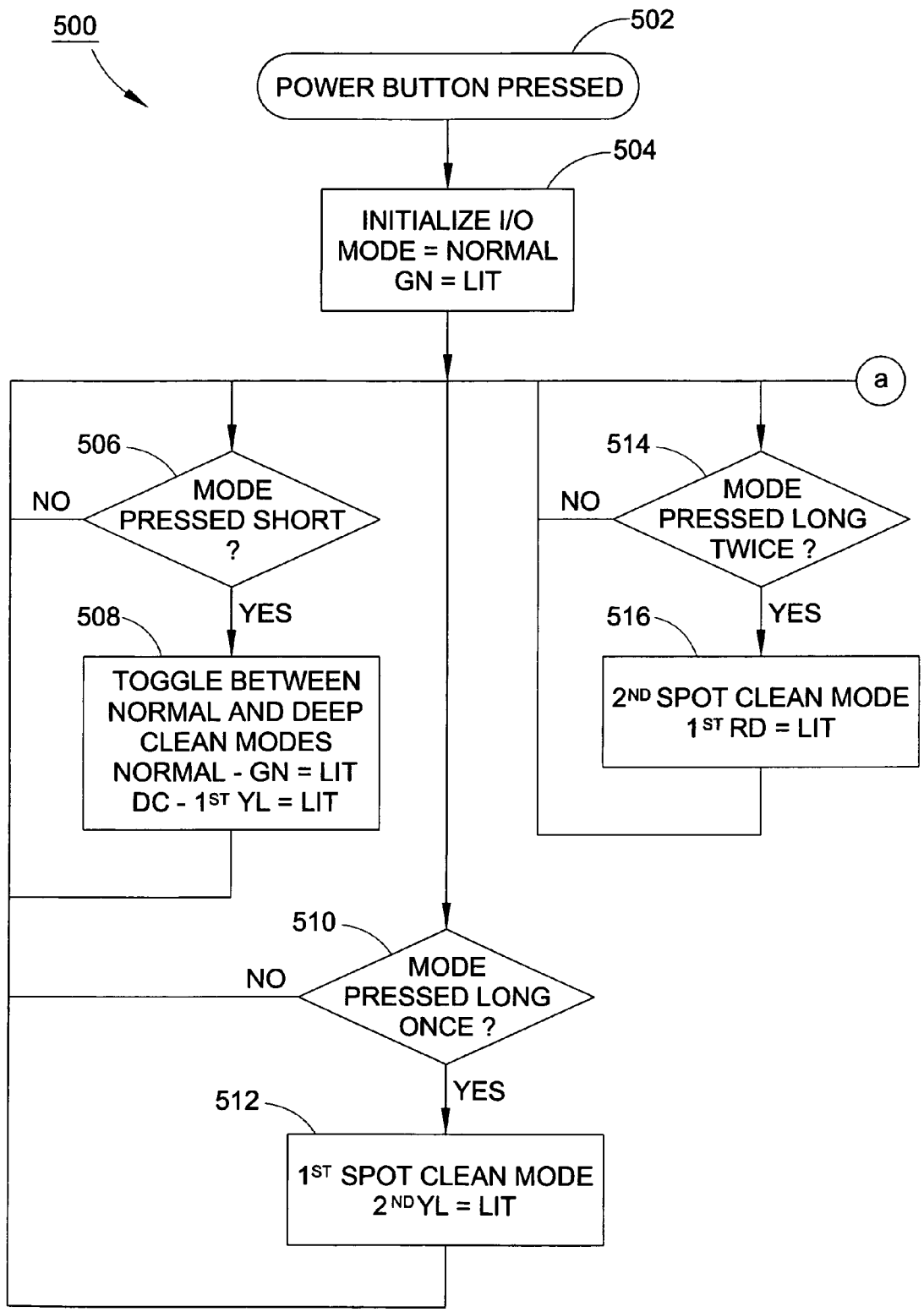
FIGS. 16-18 are sections of a flow chart showing operation and control of a robotic appliance equipped with power, mode, and start controls according to the present invention.

With reference to FIG. 16, a process 500 for main control of the robotic appliance begins at step 502 where the power button is activated. Next, the main board is initialized with a normal (i.e., default) mode (e.g., single brush roll operation) selected and the green indicator is illuminated to indicate that power is applied and the normal mode is selected (step 504). At point "a," a plurality of control loops concurrently determine when another mode is selected and when the start button is activated.

For example, at step 506, the process determines when the mode button is pressed for a short predetermined time. If so, the operating mode toggles between normal and deep clean (e.g., dual brush roll operation) (step 508). In other words, if the normal mode is currently selected, the mode is switched to deep clean mode and vice versa. When the currently selected mode switches to deep clean, the green indicator is extinguished and the first yellow indicator is illuminated. Conversely, when the currently selected mode switches to normal, the first yellow indicator is extinguished and the green indicator is illuminated. After step 508 is completed, the process returns to point "a." If the mode button is not pressed for the short predetermined time, the process remains at point "a."

At step 510, the process determines when the mode button is pressed once for a long predetermined time. If so, a first spot cleaning mode is selected, the second yellow indicator is illuminated and the process returns to point "a" (step 512). If the mode button is not pressed once for the long predetermined time, the process remains at point "a."

At step 514, the process determines when the mode button is pressed twice for a long predetermined time. If so, a second spot cleaning mode is selected, the first red indicator is illuminated and the process returns to point "a" (step 516). If the mode button is not pressed twice for the long predetermined time, the process remains at point c "a."

Figure 17:
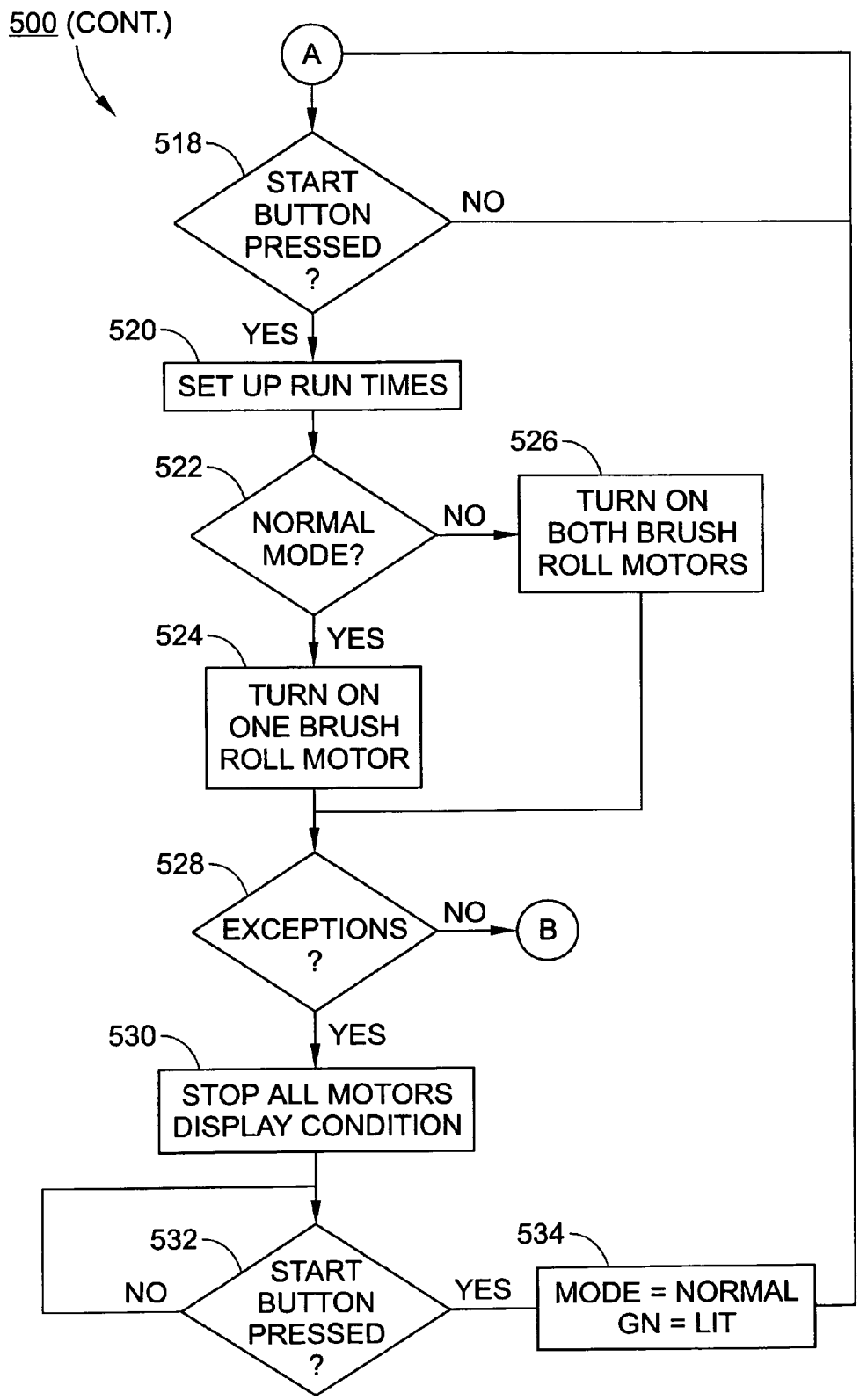

With reference to FIG. 17, point "a" also extends to step 518 where the process 500 determines when the start button is pressed. If so, the process advances to step 520 where run times are set up. If the start button is not pressed, the process remains at point "a."

After step 520 is complete, the process determines if the normal mode is selected (step 522). If so, one brush roll motor is turned on (step 524), otherwise both brush roll motors are turned on because deep clean mode is selected (step 526). At step 528, the process determines if exceptions must be handled. These exceptions include detection of a pickup condition (i.e., robotic appliance picked up), battery low condition, over-current condition, and timeout condition. If there are exceptions to handle, the process stops all motors and illuminates a predetermined indicator or combination of indicators either continuously or in a flashing pattern to display the particular exception condition that was detected (step 530). Next, at step 532, the process determines if the start button is pressed to stop or reset the robotic appliance. If so, the process stops the brush roll motor(s) and returns to point "a" with the normal or default mode selected and the green indicator illuminated (step 534), otherwise the process waits for the start button to be pressed at step 532.

Figure 18:
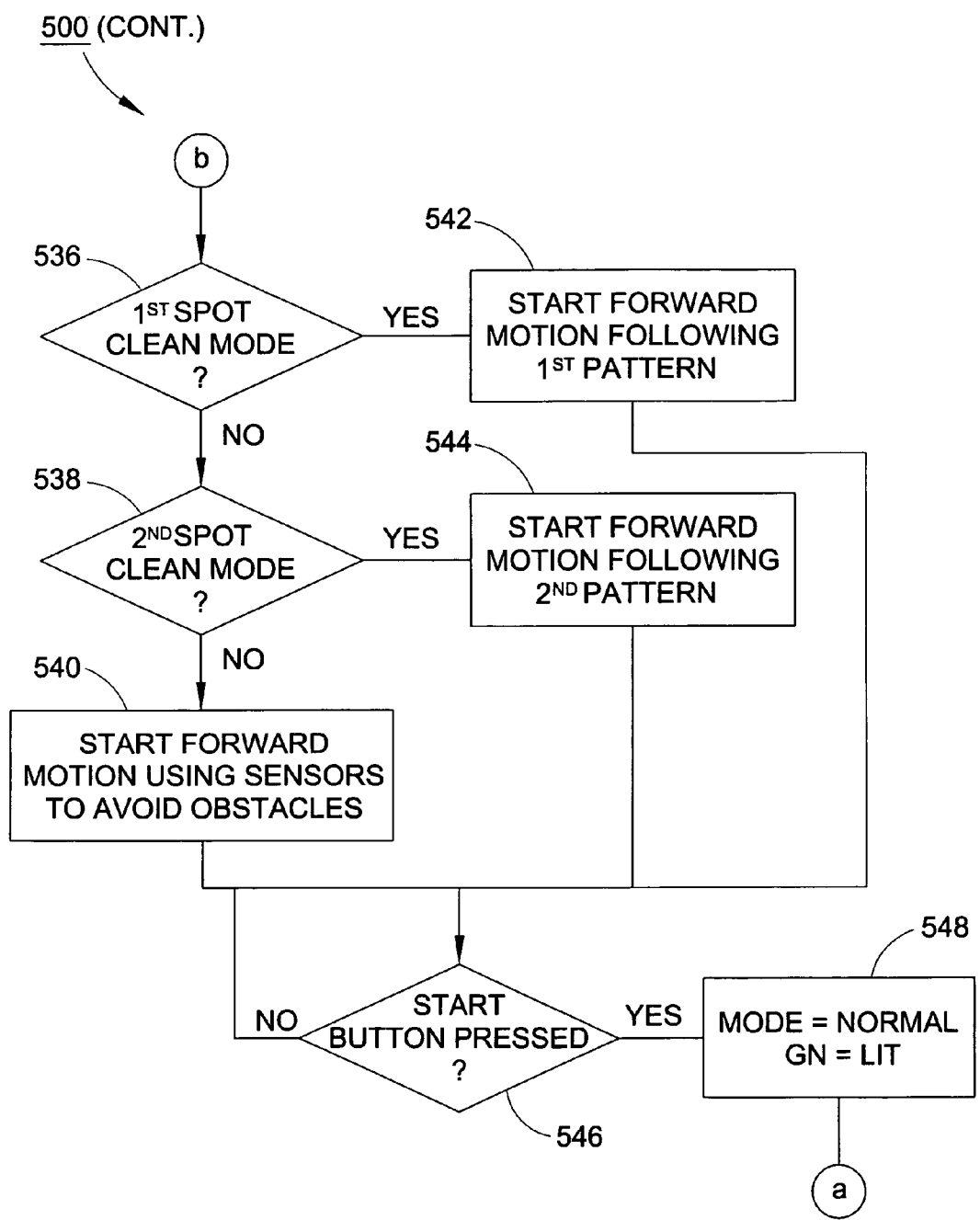

With reference to FIG. 18, if there are no exceptions to handle at step 528, the process 500 advances to step 536 to determine if the first spot clean mode is selected. If the first spot clean mode is not selected, the process determines if the second spot clean mode is selected (step 538). If the second spot clean mode is not selected, the process advances to step 540 and starts forward motion using sensors to avoid obstacles because no specialized cleaning mode is selected. If the first spot clean mode is selected, from step 536 the process advances to step 542 and starts forward motion which follows a first predetermined pattern to perform spot cleaning, for example, of a three square foot area. If the second spot clean mode is selected, from step 538 the process advances to step 544 and starts forward motion which follows a second predetermined pattern to perform spot cleaning, for example, of a five square foot area.

Forward motion along the first and/or second predetermined patterns for the specialty cleaning modes may be adjusted using sensors to avoid obstacles within the area to be cleaned. Alternatively, if obstacles are detected by the sensors in the area to be cleaned in these specialty cleaning modes, the robotic appliance may handle the situation as an exception and stop cleaning operations until an operator can intervene and reset or restart the device as shown in steps 528-534. Forward motion during steps 540, 542, 544 to avoid obstacles may be controlled in the same manner as depicted in steps 224-294 of FIGS. 8-10.

At any point after steps 540, 542, and 544, an operator may stop or reset the robotic appliance by pressing the start button. At step 546, the process determines when the start button is pressed to stop or reset the robotic appliance. If so, the process stops the brush roll and drive motors and returns to point "a" with the normal or default mode selected and the green indicator illuminated (step 548), otherwise the process continues current cleaning operations in steps 540, 542, or 544.

As with the embodiment described above and depicted in FIG. 1, in the embodiment of FIG. 14, the bumper 18' floats over the base cover 14' on the bumper springs 40. In other words, the bumper 18' is spaced from the base cover 14' and base 12' by resilient biasing means (e.g., bumper springs 40') such that the bumper 18' can move in relation to the base cover 14' and base 12'. The only rigid link between the bumper 18' and the base 12' is the joystick sensor assembly 92'. A boss or socket 97' (FIGS. 19 and 20) in the bumper 18' receives the head 96' of the joystick sensor assembly 92'. When the robotic appliance 10' moves and the bumper 18' comes in contact with a barrier or another type of obstacle, the bumper 18' moves. This causes the head 96' to move the shaft 95' extending from the joystick sensor 94'. The main PCB assembly 36' detects contact with the obstacle based on a signal from the joystick sensor 94' corresponding to the movement of the shaft 95'. The base 12' or base cover 14' may includes stops that limit movement of the bumper 18' so that it cannot move beyond the range of movement of the shaft 95' associated with the joystick sensor 94'. In the embodiment being described, the bottom brackets 58' attached to the bumper 18' cooperate with cavities in the base 12' to guide and restrict horizontal movement of the base 12' in relation to the bumper 18' so that such movement does not exceed the range of the shaft 95' when the bumper 18' comes in contact with an obstacle. In an alternate embodiment, the bumper 18' can be formed by multiple sections. For example, two half sections or four quadrant sections.

Figure 19:
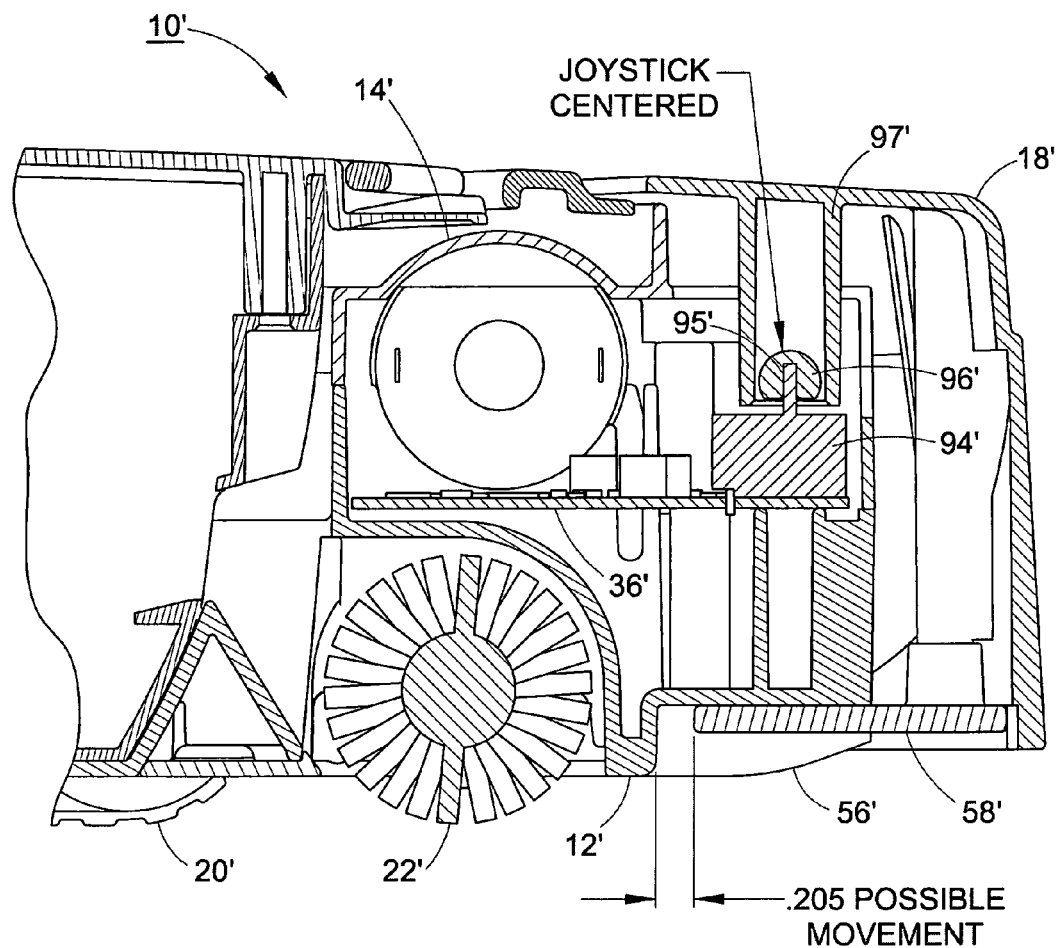
FIG. 19 is a partial cross-section view of an embodiment of a robotic appliance according to the present invention with an on-board joystick sensor shown in its normal centered position.
Figure 20:
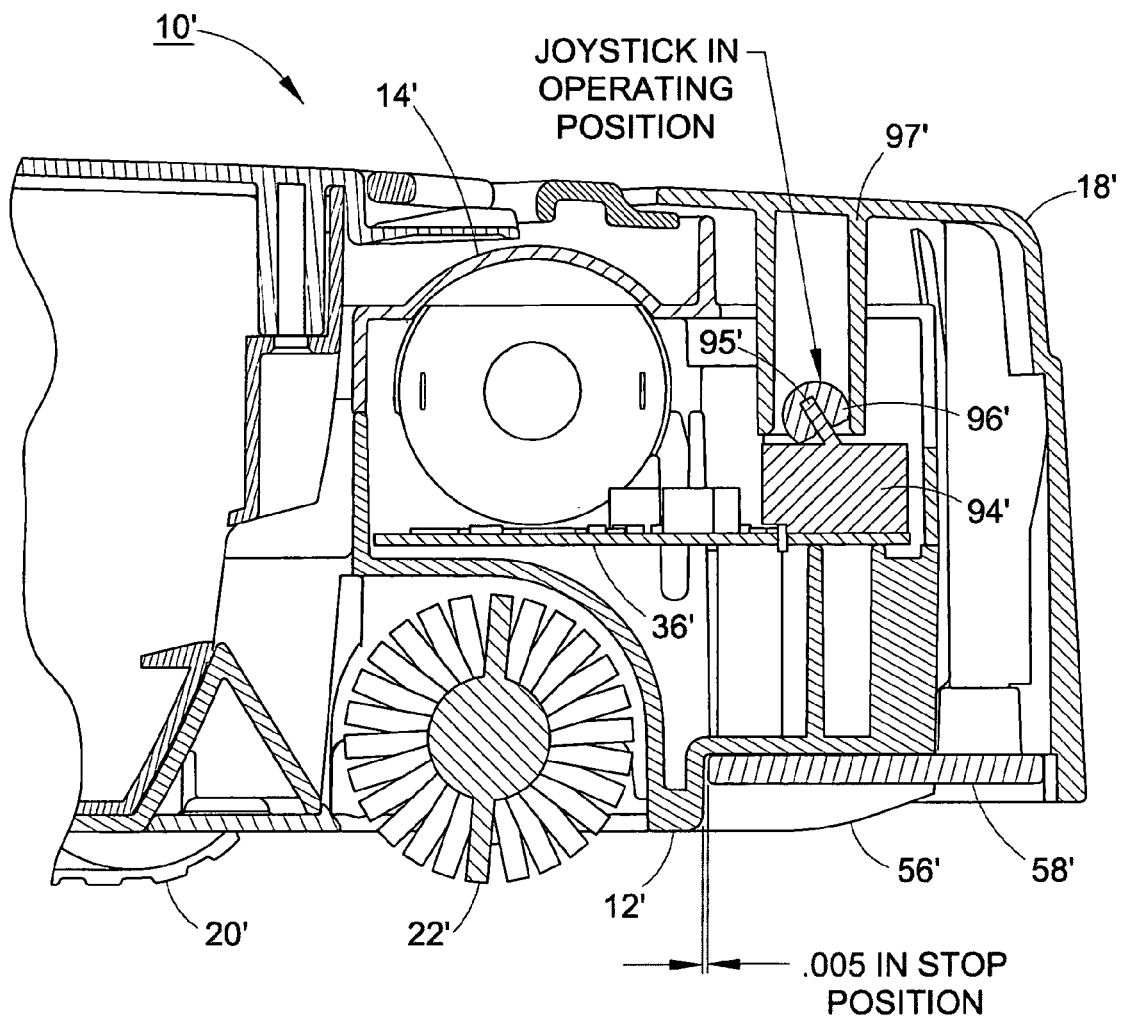
FIG. 20 is a partial cross-section view of an embodiment of a robotic appliance according to the present invention with an on-board joystick sensor shown in a deflected position due to, for example, contact with an obstacle.

With reference to FIGS. 19 and 20, partial cross section views of the robotic appliance 10' show an exemplary "before" and "after" condition of the joystick sensor 94' when the robotic appliance 10' comes into contact with an obstacle. FIG. 19 reflects the "before" condition and FIG. 20 the "after" condition. The base 12', base cover 14', bumper 18', drive belt/tread assembly 20', brush roll assembly 22', main PCB assembly 36', nozzle guard 56', and bottom bracket 58' are also shown in both figures. As shown, the bottom bracket 58' is attached to the bumper 18' and a horizontal surface area of the bottom bracket 58' is normally in sliding contact relation with a horizontal surface area of the base 12'. Notably, when the bumper 18' comes into contact with the obstacle, the bumper 18' and bottom bracket 58' stops traversing while the base 12' and other components of the robotic appliance 10' continue traversing.

When the obstacle is contacted, a horizontal surface of base 12' slides across a corresponding horizontal surface area of the bottom bracket 58' and a vertical surface area of the base 12' approaches a corresponding vertical surface area of the bottom bracket 58'. As this is happening, a boss or socket 97' extending downward from the bumper 18' over the head 96' of the joystick sensor 94' causes the shaft 95' extending upward from the joystick sensor 94' to be deflected in the opposite direction of the obstacle. This varies the signal from the joystick sensor 94' so that the main PCB assembly 36' can stop movement of the robotic appliance 10' and initiate an appropriate algorithm to move away and attempt to avoid the obstacle. The base 12' and other components may continue to move while the bumper 18' and bottom bracket 58' are relatively stationary until a portion of the vertical surface area of the base 12' contacts a corresponding portion of the vertical surface area of bottom bracket 58'. If these vertical surfaces come into contact before the main PCB assembly 36' stops forward movement of the robotic appliance 10', the base 12' stops sliding across the horizontal surface of the bottom bracket 58. The relative movement between the base 12' and bottom bracket 56' can be limited. For example, in the embodiment shown in the figures, the relative movement can be approximately 0.2 inches.

The amount of relative movement is dependent on the cooperating shapes of the bottom bracket 56' and a corresponding cavity in the base 12' formed by the vertical surface and horizontal surface of the base 12' referred to above. Each bottom bracket 58' cooperates with a corresponding cavity in the base 12' so that relative movement between the bumper 18' and the base 12' is generally uniform for contact with obstacles in any direction. Movement between the base 12 and bottom brackets 58 of the robotic appliance 10 depicted in FIG. 1 is guided and restricted in the same manner as described above.

With reference to FIGS. 24 and 25, another technique for restricting movement of the bumper 18' in relation to the base 12' and base cover 14' in the robotic appliance 10' is depicted. In one embodiment, this technique may be used in place of the technique shown in FIGS. 19 and 20. In another embodiment, both techniques may be implemented together. In still another embodiment, this technique may be used for generally restricting horizontal movement of the bumper 18' and the technique shown in FIGS. 19 and 20 may be implemented merely to movably mount the bumper 18' to the base 12'. In this alternative embodiment, the cavities in the base 12' do not have to create stops for the bottom brackets 58'. Therefore, the size, shapes, and correlation of the cavities to the bottom brackets 58' require less precision.

With reference to FIG. 24, a cross-section of the robotic appliance 10' shows the base 12', base cover 14', and bumper 18'. A boss or socket 456 may extend downward from the bumper 18' toward the base cover 14'. A corresponding socket, stud, projection, or boss 458 may extend upward from base cover 14' toward the bumper 18'. The boss 458 may project into the socket 456 when to the bumper 18' is installed. This restricts horizontal movement of the bumper in relation to the base 12' and base cover 14' when the robotic appliance comes in contact with an obstacle. As shown, horizontal movement may be limited to 0.201 inches so that the shaft 95' (FIG. 20) on the joystick sensor 94' (FIG. 20) is not pushed to exceed operational range of movement. A second socket/boss set is shown in FIG. 24 opposite the socket 456 and boss 458. The second and further additional socket/boss sets are optional.

With reference to FIG. 25, a cutaway cross-section of the robotic appliance 10' shows a closer view of the base cover 14', bumper 18', socket 456, and boss 458 from a different perspective. Note that the normal position is shown with the socket 456 surrounding the boss 458 such that the boss 458 is generally centered within the socket 456.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

What is claimed is:

1. A robotic appliance, including:
   a housing;
   a joystick sensor mounted to the housing and configured to provide one or more sensed signals that vary as the robotic appliance traverses a surface area and comes in contact with an associated obstacle;
   a propelling mechanism mounted to the housing and in communication with the controller, wherein the propelling mechanism moves the robotic appliance over the surface area;
   a bumper that defines a periphery for at least a front section and a rear section of the robotic appliance in an x-y plane corresponding to the surface on which the robotic appliance is positioned, wherein the bumper is in operative communication with the joystick sensor so that movement of the bumper in relation to the housing varies the one or more sensed signals provided by the joystick sensor; and
   a controller mounted to the housing and adapted to receive the one or more sensed signals from the joystick sensor, wherein the controller determines the direction of the associated obstacle in relation to the x-y plane, based at least in part on the one or more sensed signals and controls an operation of the propelling mechanism based at least in part on the direction of the obstacles;
   the joystick sensor including:
   a two-axis potentiometer joystick including a spring-activated return-to-center shaft; and
   a head attached to the shaft.

2. The robotic appliance as set forth in claim 1 wherein the one or more sensed signals vary in a manner that at least indicates the direction of the obstacle in relation to the robotic appliance and the x-y plane.

3. The robotic appliance as set forth in claim 1 wherein the bumper is movably secured to the housing to permit the bumper to move up to a predetermined distance in relation to the housing in at least the x-y plane when the bumper comes in contact with the obstacle.

4. The robotic appliance as set forth in claim 1 wherein the bumper is formed by multiple sections.

5. The robotic appliance as set forth in claim 1, further including:
   a brush roll assembly received by the housing and in operative communication with the controller, wherein the controller controls operation of the brush roll assembly; and
   a dirt cup assembly releasably received by the housing to receive and collect dirt and dust when the brush roll assembly is operated.

6. The robotic appliance as set forth in claim 1, further including:
   a vacuum/dirt cup assembly releasably received by the housing, the vacuum/dirt cup assembly including a suction motor in operative communication with the controller and a dirt cup assembly in operative communication with a nozzle and the suction motor to receive and collect dirt and dust when the suction motor is operated.

7. The robotic appliance of claim 1 wherein the bumper includes a socket oriented toward the housing and movement of the socket is generally consistent with movement of the bumper and wherein the joystick sensor is positioned on the housing so that at least a portion of the head is within the socket such that the shaft on the joystick sensor is moved when the robotic appliance comes in contact with the obstacle.

8. The robotic appliance as set forth in claim 1, further including:
   a plurality of bumper springs interposed between the housing and the bumper for spacing the bumper from the housing and resiliently biasing the bumper toward a predetermined normal position in relation to the housing; and
   a plurality of brackets secured to the bumper to moveably secure the bumper to the housing and permit restricted movement of the bumper in relation to the housing in the x-y plane.

9. The robotic appliance as set forth in claim 1 wherein the bumper includes at least one socket oriented toward the housing and movement of the socket is generally consistent with movement of the bumper, wherein the housing includes a corresponding boss positioned on the housing so that at least a portion of the boss is within the associated socket, and wherein each socket and boss combination restrict movement of the bumper in relation to the housing in at least the x-y plane.

10. A robotic appliance, including:
    a housing;
    a joystick sensor mounted to the housing and configured to provide one or more sensed signals that vary as the robotic appliance traverses a surface area and comes in contact with an associated obstacle, wherein the joystick sensor includes a shaft and a biasing member for urging the shaft to a center position;

a propelling mechanism mounted to the housing and in communication with the controller, wherein the propelling mechanism moves the robotic appliance over the surface area;

a bumper that defines at least a portion of a periphery of the robotic appliance in an x-y plane corresponding to the surface on which the robotic appliance is positioned, wherein the bumper is in operative communication with the joystick sensor so that movement of the bumper in relation to the housing varies the one or more sensed signals provided by the joystick sensor; and a controller mounted to the housing and adapted to receive the one or more sensed signals, wherein the controller determines the direction of the obstacle in relation to the x-y plane, based at least in part on the one or more sensed signals and controls an operation of the propelling mechanism to move away from the associated obstacle in response to the contact with the associated obstacle and to continue traversing the surface so as to avoid the associated obstacle based at least in part on the direction of the associated obstacle.

11. The robotic appliance as set forth in claim 10 wherein the one or more sensed signals vary in a manner that at least indicates the direction of the obstacle in relation to the robotic appliance and the x-y plane.

12. The robotic appliance as set forth in claim 10 wherein the bumper is movably secured to the housing to permit the bumper to move up to a predetermined distance in relation to the housing in at least the x-y plane when the bumper comes in contact with the obstacle.

13. The robotic appliance as set forth in claim 10 wherein the bumper is formed by multiple sections.

14. The robotic appliance as set forth in claim 10, further including:

a brush roll assembly received by the housing and in operative communication with the controller, wherein the controller controls operation of the brush roll assembly; and a dirt cup assembly releasably received by the housing to receive and collect dirt and dust when the brush roll assembly is operated.

15. The robotic appliance as set forth in claim 10, further including:

a vacuum/dirt cup assembly releasably received by the housing, the vacuum/dirt cup assembly including a suction motor in operative communication with the controller and a dirt cup assembly in operative communication with the suction motor and the surface area to receive and collect dirt and dust when the suction motor is operated.

16. The robotic appliance as set forth in claim 10, the joystick sensor including:

a head mounted on the shaft.

17. The robotic appliance of claim 16 wherein the bumper includes a socket oriented toward the housing and movement of the socket is generally consistent with movement of the bumper and wherein the joystick sensor is positioned on the housing so that at least a portion of the head is within the socket such that the shaft on the joystick sensor is moved when the robotic appliance comes in contact with the obstacle.

18. The robotic appliance as set forth in claim 10, further including:

a plurality of bumper springs interposed between the housing and the bumper for spacing the bumper from the housing and resiliently biasing the bumper toward a predetermined normal position in relation to the housing; and a plurality of brackets secured to the bumper to moveably secure the bumper to the housing and permit restricted movement of the bumper in relation to the housing in the x-y plane.

19. The robotic appliance as set forth in claim 10 wherein the bumper includes at least one socket oriented toward the housing and movement of the socket is generally consistent with movement of the bumper, wherein the housing includes a corresponding boss positioned on the housing so that at least a portion of the boss is within the associated socket, and wherein each socket and boss combination restrict movement of the bumper in relation to the housing in at least the x-y plane.

20. A robotic appliance for performance of a desired task while traversing a surface area, the robotic appliance including:

a housing;

a return-to-center joystick sensor mounted to the housing and configured to provide one or more sensed signals that vary as the robotic appliance traverses a surface area and comes in contact with an associated obstacle;

a propulsion mechanism mounted to the housing;

a cleaning element mounted to the housing;

first control means for powering up the robotic appliance;

second control means for selecting an operating mode for the robotic appliance;

third control means for starting operation of the robotic appliance;

processing means mounted to the housing and adapted to receive the one or more sensed signals in communication with the first, second, and third control means, propulsion mechanism, and cleaning element for: i) controlling the propulsion mechanism to move the robotic appliance over the surface area based at least in part on the operating mode selected, ii) controlling the cleaning element to perform the desired task based at least in part on the operating mode selected, iii) determining when the robotic appliance comes in contact with the obstacle and at least a direction of the obstacle in relation to the robotic appliance and an x-y plane corresponding to the surface area, and iv) controlling the robotic appliance in response to the contact with the obstacle; and a bumper that defines a periphery for at least a front section and a rear section of the robotic appliance in the x-y plane, wherein the bumper is in operative communication with the joystick sensor so that movement of the bumper in relation to the housing varies the one or more sensed signals provided by the joystick sensor.

21. The robotic appliance as set forth in claim 20, further including:

means for varying the one or more sensed signals in a manner that at least indicates the direction of the obstacle in relation to the robotic appliance and the x-y plane.

22. The robotic appliance as set forth in claim 20, further including:

a resilient member for biasing the bumper toward a predetermined normal position in relation to the housing.

23. The robotic appliance as set forth in claim 20, the cleaning element including:

a brush roll assembly received by the housing and in operative communication with the controller; and a dirt cup assembly releasably received by the housing to receive and collect the dirt and dust when the brush roll assembly is operated.

24. The robotic appliance as set forth in claim 20, the cleaning element including:
a vacuum/dirt cup assembly releasably received by the housing, the vacuum/dirt cup assembly including:
a suction motor in operative communication with the controller; and
a dirt cup assembly in operative communication with the suction motor and the surface area to receive and collect dirt and dust when the suction motor is operated.

25. The robotic appliance as set forth in claim 20 wherein the bumper is movably secured to the housing to permit the bumper to move up to a predetermined distance in relation to the housing in at least the x-y plane when the bumper comes in contact with the obstacle.

26. The robotic appliance as set forth in claim 20 wherein the bumper is formed by multiple sections.

27. The robotic appliance as set forth in claim 20 wherein the bumper includes at least one socket oriented toward the housing and movement of the socket is generally consistent with movement of the bumper, wherein the housing includes a corresponding boss positioned on the housing so that at least a portion of the boss is within the associated socket, and wherein each socket and boss combination restrict movement of the bumper in relation to the housing in at least the x-y plane.

28. A robotic appliance for performance of a desired task traversing a surface area, the robotic appliance including:
a housing;
a resiliently biased return-to-center joystick sensor mounted to the housing and configured to provide one or more sensed signals that vary as the robotic appliance traverses a surface area and comes in contact with an obstacle;
traction means mounted to the housing;
functional means mounted to the housing;
a bumper that defines a periphery of the robotic appliance in an x-y plane corresponding to the surface area, wherein the bumper is in operative communication with the joystick sensor so that movement of the bumper in relation to the housing varies the one or more sensed signals provided by the joystick sensor;
first control means for powering up the robotic appliance;
second control means for selecting an operating mode for the robotic appliance;
third control means for starting operation of the robotic appliance; and
processing means mounted to the housing and adapted to receive the one or more sensed signals in communication with the traction means, functional means, and first, second, and third control means for: i) controlling the traction means to propel the robotic appliance over the surface area based at least in part on the operating mode selected, ii) controlling the functional means to perform the desired task based at least in part on the operating mode selected, iii) determining when the robotic appliance comes in contact with the obstacle and at least a direction of the obstacle in relation to the robotic appliance and the x-y plane based at least in part on the one or more sensed signals, and iv) controlling movement of the robotic appliance to move away from the obstacle in response to the contact with the obstacle in response to the contact with the obstacle and to continue traversing the surface area so as to avoid the obstacle based at least in part on the direction of the obstacle.

29. The robotic appliance as set forth in claim 28, further including:
means for varying the one or more sensed signals in a manner that at least indicates the direction of the obstacle in relation to the robotic appliance and the x-y plane.

30. The robotic appliance as set forth in claim 28, further including:
means for resiliently biasing the bumper toward a predetermined normal position in relation to the housing.

31. The robotic appliance as set forth in claim 28, the functional means including:
a brush roll assembly received by the housing and in operative communication with the controller; and
a dirt cup assembly releasably received by the housing to receive and collect the dirt and dust when the brush roll assembly is operated.

32. The robotic appliance as set forth in claim 28, the functional means including:
a vacuum/dirt cup assembly releasably received by the housing, the vacuum/dirt cup assembly including:
a suction motor in operative communication with the controller; and
a dirt cup assembly in operative communication with the suction motor and the surface area to receive and collect dirt and dust when the suction motor is operated.

33. The robotic appliance as set forth in claim 28 wherein the bumper is movably secured to the housing to permit the bumper to move up to a predetermined distance in relation to the housing in at least the x-y plane when the bumper comes in contact with the obstacle.

34. The robotic appliance as set forth in claim 28 wherein the bumper is formed by multiple sections.

35. The robotic appliance as set forth in claim 28 wherein the bumper includes at least one socket oriented toward the housing and movement of the socket is generally consistent with movement of the bumper, wherein the housing includes a corresponding boss positioned on the housing so that at least a portion of the boss is within the associated socket, and wherein each socket and boss combination restrict movement of the bumper in relation to the housing in at least the x-y plane.

36. The robotic appliance as set forth in claim 20, the joystick sensor including:
a two-axis potentiometer joystick including a spring-activated return-to-center shaft; and
a head mounted on the shaft.

37. The robotic appliance as set forth in claim 28, the joystick sensor including:
a two-axis potentiometer joystick including a spring-activated return-to-center shaft; and
a head mounted on the shaft.

* * * * *

UNITED STATES PATENT AND TRADEMARK OFFICE
CERTIFICATE OF CORRECTION

PATENT NO.      : 7,603,744 B2
APPLICATION NO. : 10/946219
DATED           : October 20, 2009
INVENTOR(S)     : Mark E. Reindle It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1274 days.

Signed and Sealed this

Fifth Day of October, 2010

David J. Kappos
*Director of the United States Patent and Trademark Office*